United States Patent
Gideon, III

(10) Patent No.: US 11,050,760 B2
(45) Date of Patent: Jun. 29, 2021

(54) SYSTEMS, DEVICES, AND METHODS FOR ACCESS CONTROL AND IDENTIFICATION OF USER DEVICES

(71) Applicant: Intrinsic Value, LLC, Nashville, TN (US)

(72) Inventor: Clarence J. Gideon, III, Nashville, TN (US)

(73) Assignee: INTRINSIC VALUE, LLC, Nashville, TN (US)

(*) Notice: Subject to any disclaimer, the term of this patent is extended or adjusted under 35 U.S.C. 154(b) by 0 days.

(21) Appl. No.: 16/657,055

(22) Filed: Oct. 18, 2019

(65) Prior Publication Data
US 2020/0053097 A1 Feb. 13, 2020

Related U.S. Application Data

(62) Division of application No. 15/813,136, filed on Nov. 14, 2017.
(Continued)

(51) Int. Cl.
| | |
|---|---|
| H04L 9/32 | (2006.01) |
| G07C 9/00 | (2020.01) |
| H04L 29/06 | (2006.01) |
| G07C 9/27 | (2020.01) |
| H04L 29/08 | (2006.01) |
| G06F 21/45 | (2013.01) |
| H04W 8/18 | (2009.01) |
| H04W 12/06 | (2021.01) |
| H04W 12/08 | (2021.01) |

(52) U.S. Cl.
CPC .............. *H04L 63/107* (2013.01); *G07C 9/00* (2013.01); *G07C 9/00571* (2013.01); *G07C 9/27* (2020.01); *H04L 63/06* (2013.01); *H04L 63/102* (2013.01); *H04L 63/20* (2013.01); *H04L 67/22* (2013.01); *H04L 67/306* (2013.01); *G07C 2009/0088* (2013.01); *G07C 2209/04* (2013.01); *G07C 2209/08* (2013.01); *H04L 63/08* (2013.01); *H04W 8/183* (2013.01); *H04W 12/06* (2013.01); *H04W 12/08* (2013.01)

(58) Field of Classification Search
None
See application file for complete search history.

(56) References Cited

U.S. PATENT DOCUMENTS

| | | |
|---|---|---|
| 1,015,653 A | 1/1912 | Szczyglinski |
| 5,311,982 A | 5/1994 | Clopton |
| (Continued) | | |

FOREIGN PATENT DOCUMENTS

| | | |
|---|---|---|
| EP | 3039657 B1 | 7/2016 |
| JP | 2004019339 A | 1/2004 |
| (Continued) | | |

OTHER PUBLICATIONS

August Smart Lock | "Your smart home starts at the Front Door", https://august.com, last accessed on Sep. 11, 2018.
(Continued)

*Primary Examiner* — Venkat Perungavoor
(74) *Attorney, Agent, or Firm* — Jason P. Mueller; FisherBroyles, LLP

(57) ABSTRACT

Systems, devices, and techniques that can provide access control and/or identification of user devices.

17 Claims, 50 Drawing Sheets

Related U.S. Application Data

(60) Provisional application No. 62/421,770, filed on Nov. 14, 2016.

(56) References Cited

U.S. PATENT DOCUMENTS

| | | | |
|---|---|---|---|
| 7,880,584 B2 | 2/2011 | Larson et al. | |
| 8,058,971 B2 | 11/2011 | Harkins et al. | |
| 8,340,726 B1 | 12/2012 | Fujisaki | |
| 8,526,917 B2 | 9/2013 | Muller et al. | |
| 9,148,416 B2* | 9/2015 | Tse | G07C 9/00571 |
| 9,501,881 B2 | 11/2016 | Saeedi et al. | |
| 9,589,439 B2* | 3/2017 | Golden | B60R 25/018 |
| 9,619,954 B2 | 4/2017 | Allibhoy et al. | |
| 9,763,094 B2 | 9/2017 | Thelen et al. | |
| 9,792,747 B2 | 10/2017 | Baumgarte et al. | |
| 9,800,737 B2 | 10/2017 | Gaspard et al. | |
| 9,824,193 B2 | 11/2017 | Ganapathy et al. | |
| 9,858,595 B2 | 1/2018 | Barnes, Jr. | |
| 9,934,635 B2 | 4/2018 | Turner et al. | |
| 9,979,438 B2 | 5/2018 | Belk et al. | |
| 10,037,642 B2 | 7/2018 | Padgett et al. | |
| 10,068,077 B2 | 9/2018 | Mucci et al. | |
| 10,102,697 B2 | 10/2018 | Sample | |
| 10,127,750 B2 | 11/2018 | Cordiner et al. | |
| 10,142,843 B2 | 11/2018 | Conrad et al. | |
| 10,171,935 B1 | 1/2019 | Reyes et al. | |
| 10,229,548 B2 | 3/2019 | Daniel-Wayman et al. | |
| 10,255,736 B2 | 4/2019 | Kuruba et al. | |
| 10,269,195 B2 | 4/2019 | Klein et al. | |
| 2004/0160304 A1 | 8/2004 | Mosgrove et al. | |
| 2004/0162786 A1* | 8/2004 | Cross | H04L 9/30 705/59 |
| 2007/0176739 A1 | 8/2007 | Raheman | |
| 2007/0197261 A1 | 8/2007 | Humbel | |
| 2009/0039156 A1 | 2/2009 | Brandli et al. | |
| 2009/0121890 A1 | 5/2009 | Brown et al. | |
| 2009/0160673 A1 | 6/2009 | Cirker | |
| 2013/0029588 A1 | 1/2013 | Bienas et al. | |
| 2014/0075075 A1 | 3/2014 | Morrill et al. | |
| 2014/0201066 A1 | 7/2014 | Roux et al. | |
| 2015/0067792 A1* | 3/2015 | Benoit | H04W 12/06 726/5 |
| 2015/0295901 A1 | 10/2015 | Woodward et al. | |
| 2016/0248782 A1 | 8/2016 | Troesch | |
| 2016/0319568 A1 | 11/2016 | Kristensen | |

FOREIGN PATENT DOCUMENTS

| | | |
|---|---|---|
| JP | 2009084872 A | 4/2009 |
| KR | 1020070001477 A | 1/2007 |
| KR | 1020100097644 A | 9/2010 |
| WO | 2012/091940 A1 | 7/2012 |
| WO | 2016/019064 A1 | 2/2016 |

OTHER PUBLICATIONS

Ring. | "Video Doorbells and Security Cameras for Your Smartphone". Https://ring.com, last accessed on Sep. 11, 2018.

Master Lock. |'Access. Remastered', www.masterlock.com/bluetooth, last accessed on Sep. 11, 2018.

Nokë | "Bluetooth Padlock, Door Lock, U-Lock" | Keyless Lock Management for Your Business. Noke.com, last accessed on Jan. 29, 2020.

* cited by examiner

My Card - Dashboard | Logout

Jake Gideon

- Recent Activity
- Access Rights
- Employees
- Add Employee
- Roles
- Zones
- Departments
- Settings

ALL ACTIVITY    ZONES ACTIVITY    CARD EXCHANGES

All Departments     [FILTER BY DATE]

John Doe met Nestor Alcantara
John Doe met Nestor Alcantara
John Doe met Nestor Alcantara
Nestor Alcantara met Tristian Azuara
Nestor Alcantara met Tristian Azuara
Jake Gideon met John Doe
John Doe met Nestor Alcantara
John Doe met Nestor Alcantara
Nestor Alcantara exited Zone C
John Doe entered Zone C
Jake Gideon exited Zone A
Jane Doe met Nestor Alcantara
Tristian Azuara entered Zone B
Jake Gideon met Jane Doe

My Card - Dashboard | Log out

Jake Gideon
- Recent Activity
- Access Rights
- Employees
- Add Employee
- Roles
- Zones
- Departments
- Settings

ALL ACTIVITY | ZONE ACTIVITY | CARD EXCHANGES

All Departments | FILTER BY DATE

Nestor Alcantara exited Zone C
John Doe entered Zone C
Jake Gideon exited Zone A
Tristian Azuara entered Zone B
Nestor Alcantara entered Zone C

My Card - Dashboard | Logout

Jake Gideon

- Recent Activity
- Access Rights
- Employees
- Add Employee
- Roles
- Zones
- Departments
- Settings

Settings

Company                                          [EDIT]

Name:     Intrinsic Value, LLC
Address:  524 Wesview
          Nashville, TN 37205
          USA
Server:   http://intrinsicvalue.herokuspp.com/

SMS - Twilio                                     [EDIT]

Account SID:          ACX197X1a1eeb3e8exx421a1187eb7804e1
Auto Tokens:          e31x788de3x072181300100000x7x28
Twilio phone number:  123-456-7890
Country phone number: +1

Managers

Will Smith
Jake Gideon
Jane Doe
Nestor Alcantara
Tristian Azuara
User Test 1
IOS Employee
Android Employee

[DEFINE MANAGERS]

| Aspect | NFC | Bluetooth | Bluetooth Low Energy |
|---|---|---|---|
| Tag Requires Power | No | Yes | Yes |
| Range | < 20 cm | ~100 m (Class 1) | ~50 m |
| 10 more rows | | | |

SYSTEMS, DEVICES, AND METHODS FOR ACCESS CONTROL AND IDENTIFICATION OF USER DEVICES

CROSS-REFERENCE TO RELATED APPLICATION

The present application is a divisional of U.S. patent application Ser. No. 15/813,136, filed Nov. 14, 2017, which is related to and claims the benefit of U.S. Provisional Patent Application No. 62/421,770, filed Nov. 14, 2016, the contents of each of which are incorporated herein by reference in their entirety.

BRIEF DESCRIPTION OF THE DRAWINGS

The accompanying drawings form part of the disclosure and are incorporated into the subject specification. The drawings illustrate example embodiments of the disclosure and, in conjunction with the present description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like, but not necessarily the same or identical, elements throughout.

FIG. 15 illustrates an example of a user interface for access control and identification, according to one or more embodiments of the present disclosure.

Figure 16:
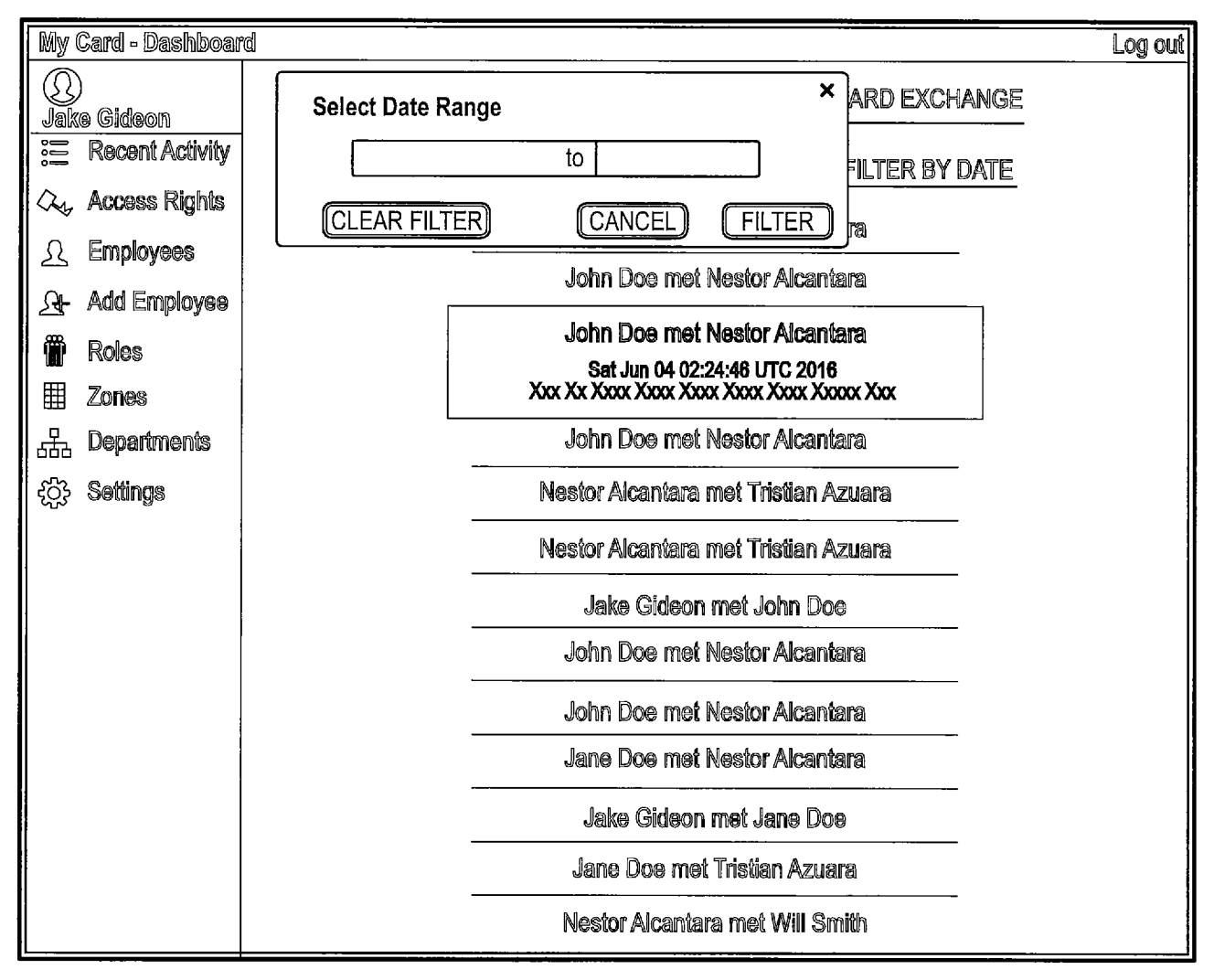

FIG. 16 illustrates an example of a user interface for access control and identification, according to one or more embodiments of the present disclosure.

FIG. 17 illustrates an example of a user interface for access control and identification, according to one or more embodiments of the present disclosure.

Figure 21:
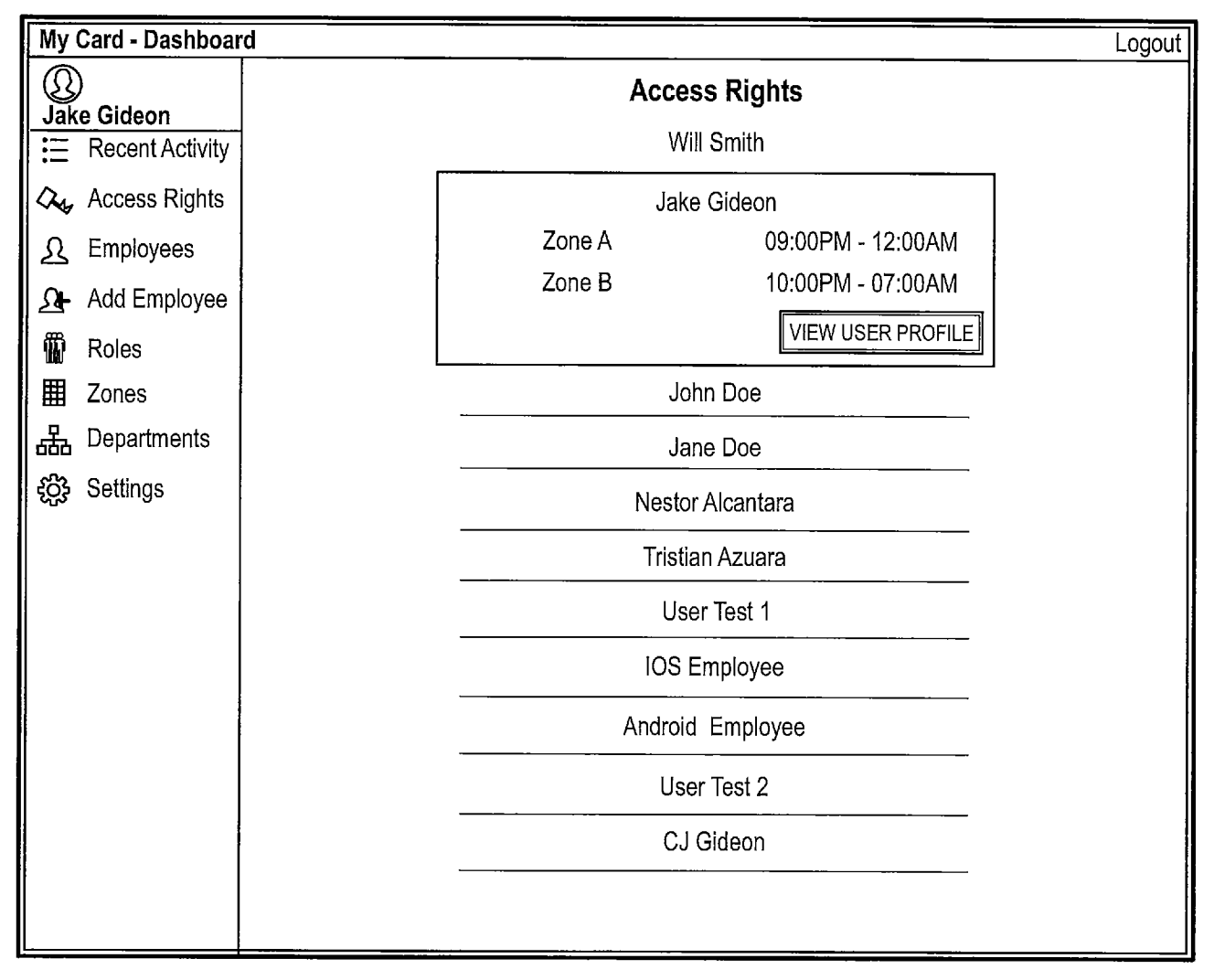

FIG. 21 illustrates an example of a user interface for access control and identification, according to one or more embodiments of the present disclosure.

FIG. 23 illustrates an example of a user interface for access control and identification, according to one or more embodiments of the present disclosure.

FIG. 24 illustrates an example of a user interface for access control and identification, according to one or more embodiments of the present disclosure.

FIG. 26 illustrates an example of a user interface for access control and identification, according to one or more embodiments of the present disclosure.

FIG. 27 illustrates an example of a user interface for access control and identification, according to one or more embodiments of the present disclosure.

DETAILED DESCRIPTION

Exemplary embodiments of the present disclosure provide for an improved digital identification, networking, communication, and security system, devices, and methods. Embodiments of the disclosure can be utilized as a time-saving enterprise system including a multi-faceted mobile software application ("mobile app") and a command and access control web app ("web app"). In various embodiments, the systems, devices, and methods may be configured as an "all-in-one" software application that may act as a comprehensive digital identification, networking, communication, and security system, as well as a communication, command, and control system.

Figure 1:
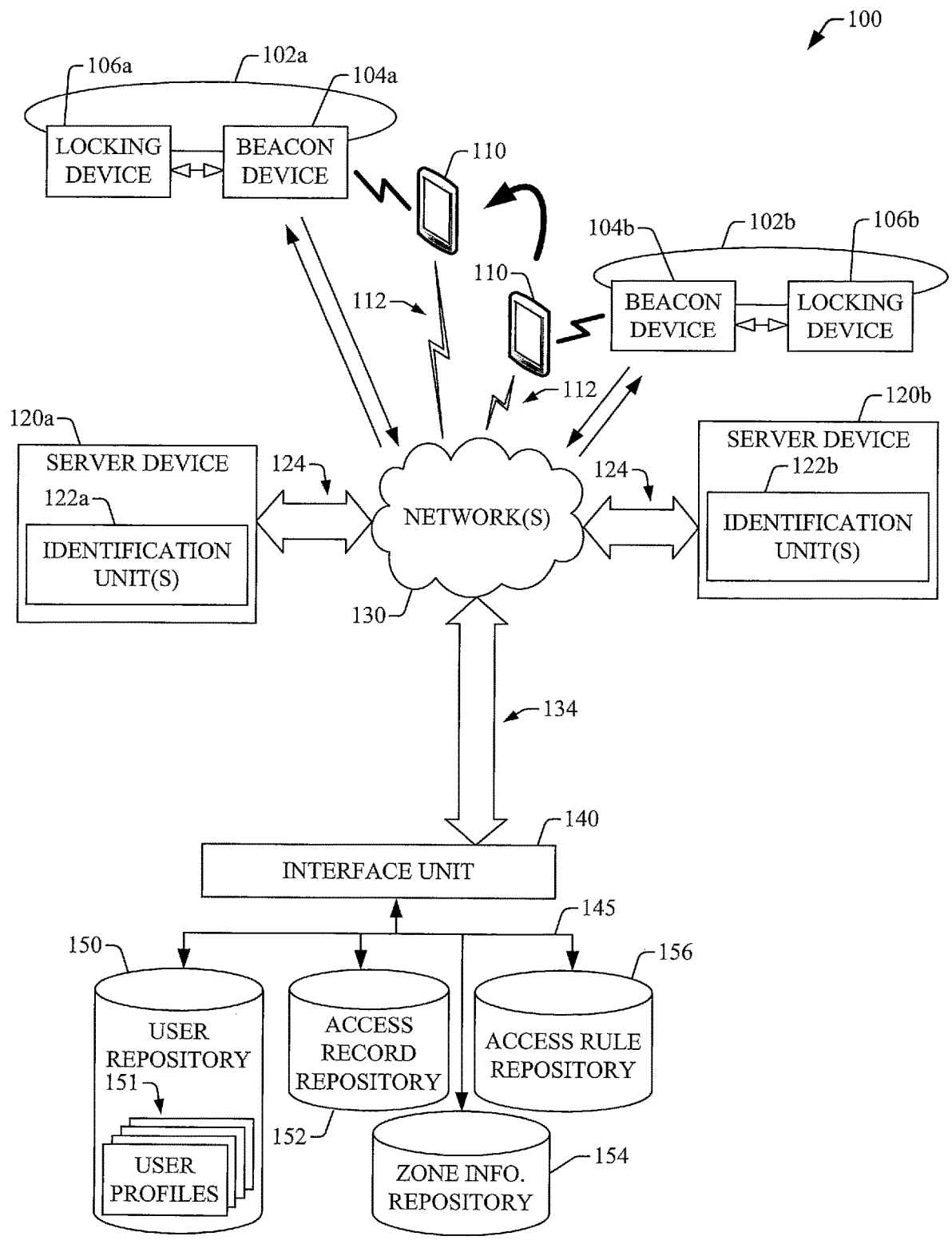
FIG. 1 presents an example of an operational environment for access control and identification of user devices, according to one or more embodiments of the present disclosure.

FIG. 1 presents an example of an operational environment 100 for identification and safety and access control in accordance with one or more embodiments of the disclosure. As is illustrated, the operational environment 100 can include a first zone 102a associated with a beacon device 104a. The first zone 102a can be embodied in or can include a defined region secured by a locking device 106a. The defined region can include a confined area indoors, a confined area outdoors, or a confined area that includes a combination of outdoors space and indoors space. The beacon device 104a and the locking device 106a can be functionally coupled (e.g., electrically coupled, mechanically coupled, and/or electromechanically coupled). The coupling can include wireless coupling and/or wireline coupling, and is represented by link(s) 107. The locking device 104a can be actuated to transition between a locked state and an unlocked state, thus unlocking or locking a gate, a door, a turnstile, a padlock, or another type of access structure. As such, the beacon device 104a and the locking device 106a can be referred to collectively as a point-of-entry device. In some embodiments, a zone (e.g., zone 102a or zone 102b) may not include a beacon device and, thus, the zone can be associated exclusively with a locking device. In one of such embodiments, the point-of-entry device can include the locking device (e.g., locking device 106a), where the locking device can be configured to exchange wireless signals with a mobile computing device according to one or more defined protocols of a radio technology (e.g., 3G, Long Term Evolution (LTE), LTE-Advanced, 5G, IEEE 802.11, IEEE 802.16, Bluetooth, ZigBee, or near-field communication (NFC)). As an example, the radio technology can include Bluetooth, and the locking device (e.g., locking device 106a) can include a Bluetooth locking pad.

The operational environment 100 also can include a second zone 102b associated with a beacon device 104b. The second zone 102b can be embodied in or can include a defined region secured by a locking device 106b. The defined region associated with the second zone 102b also can include a confined area indoors, a confined area outdoors, or a confined area that includes a combination of outdoors space and indoors space. The second zone 102b can be geographically distinct from the first zone 102a. The beacon device 104a and the locking device 106a can be functionally coupled (e.g., electrically coupled, mechanically coupled, and/or electromechanically coupled). The coupling can include wireless coupling and/or wireline coupling, and is represented by link(s) 107. The locking device 104b can be actuated to transition between a locked state and an unlocked state, thus unlocking or locking a gate, a door, a padlock, a turnstile, or another type of access structure. As such, the beacon device 104b and the locking device 106b also can be referred to collectively as a point-of-entry device. As described herein, in some embodiments, a zone (e.g., zone 102a or zone 102b) may not include a beacon device and, thus, the zone can be associated exclusively with a locking device. In one of such embodiments, the point-of-entry device can include the locking device (e.g., locking device 106*b*), where the locking device can be configured to exchange wireless signals with a mobile computing device according to one or more defined protocols of a radio technology (e.g., 3G, Long Term Evolution (LTE), LTE-Advanced, 5G, IEEE 802.11, IEEE 802.16, Bluetooth, ZigBee, or near-field communication (NFC)). As an example, the radio technology can include Bluetooth, and the locking device (e.g., locking device 106*a*) can include a Bluetooth locking pad.

The operational environment 100 also can include a server device 120*a*. In one aspect, the server device 120*a* and the beacon device 104*a* can be functionally coupled via at least one of the one or more network 130. The server device 120*a* is associated with the beacon device 104*b*. The server device 120*a* also can be associated with one or more other beacon devices. For instance, in one embodiment, the server device 120*a* can be functionally coupled to beacon device 104*b*.

The server device 120*a* can configure a zone associated with a point-of-entry device. To that end, in one aspect, the server device 120 can generate a logical association between a beacon device and a region spanned by the zone. Specifically, the server device 120*a* can generate a logical association between the region spanned by the zone 102*a* and one or more of the beacon device 104*b* and the locking device 106*a*. The server device 120*a* also can generate a record of the logical association. As is illustrated in FIG. 1, the server device 120*a* can be functionally coupled to one or more interface units 140 (represented as interface unit 140). In some embodiments, the interface unit 140 can be embodied in or can include a computing device (e.g., a server device) that includes one or more APIs that permit the exchange of information between the interface unit 140 and the server device 120*a*. Therefore, the server device 120*a* can utilize or otherwise leverage the interface unit 140 in order to retain a record of the logical association between zone 102*a* and the beacon device 104*b* and/or the locking device 106*a*. Such a record can be retained in one or more memory devices 154 (collectively referred to as zone information repository 154). As mentioned, in some embodiments, the server device 120*a* can be functionally coupled to the zone 102*b* and, thus, the server device 120*a* also can configure the zone 102*b*.

In addition, the server device 120*a* also can generate a user record including first user information (e.g., a name an address, a role within an organization, or the like) and a communication address, such as an email address. In addition, the server device 120*a* can generate an access rule using at least the user record, where the access rule can regulate entry to a zone (e.g., zone 102*a* and/or, in some embodiments, zone 102*b*). To that end, in some embodiments, the server device 120*a* can generate a schedule for authorized entry to the zone, the schedule being one of a daily schedule having a recurring group of authorized periods over a 24 hour interval; a weekly schedule having a second recurring group of authorized periods over seven days; a monthly schedule having a third recurring group of authorized periods over a month; a defined non-recurring authorized period. Accordingly, in some instances, the access rule can include a start time and an end time for authorized access.

In addition or in other embodiments, to configure the access rule, the server device 120*a* can receive input information indicative of a schedule for authorized entry to a zone (e.g., zone 102*a* and/or, in some embodiments, zone 102*b*) and can generate the access rule using at least the input information. In some instances, the input information can be input at a user interface, such as a graphical user interface (GUI), and can be sent to the server device 120*a*. The server device 120*a* can validate the access rule. For instance, the server device 120*a* can determine that the received schedule has logic integrity, e.g., an end time is later than a start time, times are adequate, and so forth. The server device 120*a* also can utilize or otherwise leverage the interface unit 140 to retain or store the access rule in one or more memory devices 156 (collectively referred to as access rule repository 156).

In some embodiments, the server device 120*a* can activate a user device to serve as access control instrument for a specific zone. For instance, the server device 120 can generate an activation code (e.g., a numeric code or an alphanumeric code), and can send the activation code to the communication address associated with a user record. In one of such embodiments, the activation code can be received and displayed (or otherwise presented) at a user device 110, which can be embodied in or can include a mobile computing device that can communicate wirelessly according to one or more radio technologies (e.g., 3G, Long Term Evolution (LTE), LTE-Advanced, 5G, IEEE 802.11, IEEE 802.16, Bluetooth, ZigBee, or near-field communication (NFC)). Such a mobile computing device can have a defined form factor, and can be embodied in or can include a smartphone, tablet computer, a wearable device, a keyfob, a pocket card, or the like.

In response to receiving the activation code, the user device 110 can generate user information including a telephone number or another type of communication address (e.g., an email address) of the mobile computing device. To that end, in one embodiment, the user device 110 can receive input information indicative or otherwise representative of the user information. More specifically, as described herein, the user device 110 also can include one or more identification units (not depicted in FIG. 1) that can cause the user device 110 to display, via a display device or display unit, for example, a user interface that includes one or more selectable visual elements. At least one of the selectable visual element(s) can be fillable, and can permit or otherwise facilitate receiving input information at the user device 110. The user device 110 can communicate wirelessly with a beacon device or other types of devices. Wireless links can permit such communication.

The user device 110 can send, to the server device 120*a*, the user information that includes a telephone number or another type of communication address (e.g., an email address) of the mobile computing device. As is illustrated in FIG. 1, the user device 110 and the server device 120*a* can be functionally via coupled to one or more wireless links 112, at least one of the network(s) 130, and one or more links 124. The server device 120*a* can receive such user information, and can generate a user profile using at least one of the user record associated with (e.g., that prompted transmission of) the activation code. In one aspect, the user profile can include the telephone number (or another type of communication address) of the user device 110. The server device 120*a* can utilize or otherwise leverage the interface unit 140 in order to retain a record of the user profile. Such a record can be retained in one or more memory devices 150 (collectively referred to as user repository 154. More specifically, the user profile can retained in one or more memory elements 151 (referred to as user profiles) which can embody or can constitute a database or another type of data structure.

The server device 120*a* also can associate the access rule created for the user record that is associated with the generated user profile. Such an association can permit assigning or otherwise associating the access rule (which also may be referred to as access right in this disclosure) to the user device 110. In one embodiment, to associate the access rule with the user profile, the server device 120a can define a relationship between the user profile and the access rule. In addition or in another embodiment, to associate the access rule with the user profile, the server device 120a can update the user profile to include the access rule. The server device 120a also can generate an access key indicative of a unique user identifier associated with the user profile. As such, the access key itself is unique. In some embodiments, the access key can be embodied in or can include one of a linear barcode or a matrix barcode (e.g., a QR code). In other embodiments, the access key can be embodied in or can include a unique code that can correspond to a radio technology that the user device 110 can utilized to transmit the unique code. In one example, the unique code can correspond to a code to be transmitted by means of Bluetooth radio technology. In another example, the unique code can correspond to a code to be transmitted by means of near field communication (NFC) radio technology. The disclosure is not limited to Bluetooth or NCF radio technologies, and the access key can be embodied in or can include a code that can be transmitted, by the user device 110, via other radio technologies, e.g., ZigBee.

The server device 120a can send an access key associated with a zone to the communication address of the user device 110. For example, the access key can be associated with zone 102a. In some embodiments, the server device 120a can generate a first access key for zone 120a and a second access key for zone 102b, and can send the first access key and the second access key to the user device 110. Access keys in accordance with this disclosure can unlock respective locking devices associated respective zones. Thus, an access key can permit or otherwise facilitate access to a credentialed zone.

As is illustrated in FIG. 1, the operational environment 100 also can include a server device 120b. In one aspect, the server device 120a and the beacon device 104a can be functionally coupled via at least one of the one or more network 130. The server device 120b is associated with the beacon device 104b. While not illustrated in FIG. 1, in some embodiments, the server device 120b also can be associated with one or more other beacon devices. For instance, in one embodiment, the server device 120b can be associated with the beacon device 104 and therefore, zone 102a. The server device 120b can be have similar architecture to that of the server device 120a and can provide similar functionality. As such, in some embodiments, the server device 120b also can generate an access key as described herein, and can send the access key to the user device 110. The access key generated by the server device 120b can be associated with zone 102b, and can permit or otherwise facilitate access to the zone 102b in accordance with an access rule configured for a user profile associated with the user device 110, for the zone 102b.

Therefore, in one aspect, the server device 120a and the server device 120b can serve as zone access controller devices (or regulator devices) that can grant respective types of access to respective zones for a user device. Accordingly, in one aspect, user devices (e.g., mobile computing devices) can include access keys issued from different zone access controller devices, the access keys providing the user devices with credentialed access to different locations and/or devices (e.g., locking devices for rental car access, front door, checking in for an appointment with the dentist, etc.) while the user device utilize respective identification units included therein.

Regardless the server device that configures a zone and/or generates an access key, the server device can provide a notification to one or more user devices (e.g., user device 110) that an access rule is configured. The one or more user devices are associated with a user profile associated with the access key and/or the access rule. The notification can be directed to an initial configuration of the access rule or to a subsequent change to the access rule. More specifically, in some embodiments, a subsequent change to an access rule can be determined at one or more rules. In one example, the server device, e.g., server device 120a, can determine that an update rule is satisfied, and can update the access rule. In another example, the server device, e.g., server device 120a, can determine that a deletion rule is satisfied, and the server device can delete the access rule. A notification of a change to an access rule can be embodied in or can include a push notification. In order to provide the push notification, the server device (e.g., server device 120a or server device 120b) can determine one or more communication addresses (e.g., telephone number, email address, or the like) of respective one or more user devices (e.g., mobile computing devices) associated with the user profile. In addition, in some embodiments, the server device can send a notification request to a messaging system to deliver the push notification, where the notification request can include including the one or more communication addresses. The messaging system can deliver the push notification. In one of such embodiments, depending on the type of notification, the messaging system can be a third-party messaging system.

In embodiments in which a notification of an updated to an access rule is embodied in or includes an email notification. The server device, e.g., server device 120a or server device 120b, that updates or otherwise configures the access rule can provide the email notification. To that end, in some aspects, the server device can determine an email addresses associated with a user profile associated with the updated access rule, and can generate or otherwise compose the email notification. The server device, e.g., server device 120a or server device 120b, also can send the email notification to the email address.

As described herein, one or more server devices (e.g., server device 120a and/or server device 120b) can generate access keys can grant the access keys to the user device 110 or any other type of mobile computing device. In addition, the user device 110 can transmit first wireless signals and can receive second wireless signals according to one or more defined protocols of a radio technology. To that, in some embodiments, the user device 110 can include a radio having one or more antennas and a communication processing unit. The one or more antennas can receive the second wireless signals, and the communication processing unit can processes the second wireless signals. In some aspects, the communication processing unit can convert analog signals associated with the second wireless signals into digital signal that can be further processed by the user device 110. Similarly, the communication processing unit can process digital signals to generate the first wireless signals, and the one or more antennas transmit the first wireless signals. In some instances, the user device 110 can attempt to enter zone 102a. To that end, in one aspect, the user device 110 can be proximate to the beacon device 104a and can initiate the establishment of a connection with the beacon device 104a. After or upon establishing the connection, the user device 110 can send an access key associated with the zone 102*a* to the beacon device 104. The beacon device 104*a* can process the access key (e.g., apply access logic) or can send the access key to the server device 120*a* or another device to process the key. In some instances, after or upon the access key is processed, the beacon device 104 can determine that access to zone 102*a* is to be granted. In response, the beacon device 104 can cause the locking device 106*a* to transition from a locked state to an unlocked state. The beacon device 104 also can send, to the server device 120*a*, for example, an indication of granted entry to zone 102*a*. The server device 120*a* can receive the indication of granted entry to zone 102*a* and, in some embodiments, can retain such an indication in the access record repository 152. In other embodiments, the server device 120*a* can generate a record of access granted by using the indication, and can retain the record in the access record repository. The record can include a timestamp indicative of a date and/or time of the denial of entry; an identifier for zone 102; an identifier of the user device 110 or a user profile associated with the user device; a combination thereof; or the like.

In addition or in other instances, after or upon the access key is processed, the beacon device 104*a* can determine that access to zone 102*a* is to be denied. In response, the locking device 106*a* can remain in a locked state. The beacon device 104 can send, to the server device 120*a*, for example, an indication of denied entry to zone 102*a*. The server device 120*a* can receive the indication of denied entry to zone 102*a* and, in some embodiments, can retain such an indication in the access record repository 152. In other embodiments, the server device 120*a* can generate a record of access denied by using the indication, and can retain the record in the access record repository. As mentioned, the record can include a timestamp indicative of a date and/or time of the denial of entry; an identifier for zone 102; an identifier of the user device 110 or a user profile associated with the user device; a combination thereof; or the like.

As described herein, the operational environment 100 also can include one or more interface units 140 (represented as interface unit 140) that can be functionally coupled with the server device 120*a* and/or the server device 120*b*. In one aspect, the interface unit 140 can be embodied in or can include a computing device (e.g., a server device) that includes one or more APIs that permit the exchange of information between the interface unit 140 and the server device 120*a* and/or the server device 120*b*. As is illustrated in FIG. 1, the interface unit 140 also can be functionally coupled to various repositories, e.g., multiple memory devices (or storage devices), that can retain various information associated with end-users, access rules, zones, access records, and the like. More specifically, in some embodiments, such repositories can include a user repository 150 that can retain one or more user profiles 152. In addition or in other embodiments, the repositories can include an access record repository 152 that can retain records (or other types of information) indicative of access attempts to zones by user devices (e.g., user device 110) and/or outcomes of the access attempts—e.g., access granted or access denied. Such zones can be associated with one or more server devices, such as server device 120*a* and/or server device 120*b*. For instance, the access record repository 152 can include records (or other type of information) indicative of access attempts to enter zone 102*a* and/or zone 102*b* by user device 110. The information retained in access record repository 152 can permit or otherwise facilitate, amongst other things, the tracking of a user device within zone(s)—either from a single organization or multiple organizations associated with the user device—thus providing clarity and record of actions; legal defensibility; or the like. Further or in other embodiments, the repositories can include a zone information repository 154 that can retain information (e.g., data and/or metadata) indicative or otherwise representative of one or more zones. For instance, the information can include first information indicative of beacon devices associated with respective zones. Still further or in yet other embodiments, the repositories can include an access rule repository 156 that can retain information indicative of access rules (e.g., a schedule of permitted entry to a zone).

Figure 1A:
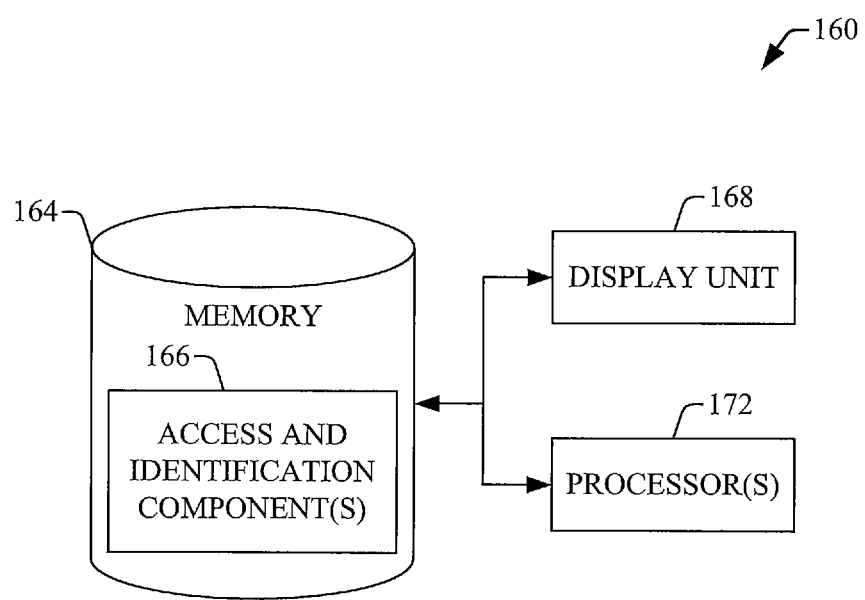
FIG. 1A presents an example of a server device for access control and identification of user devices, according to one or more embodiments of the present disclosure.
Figure 25:
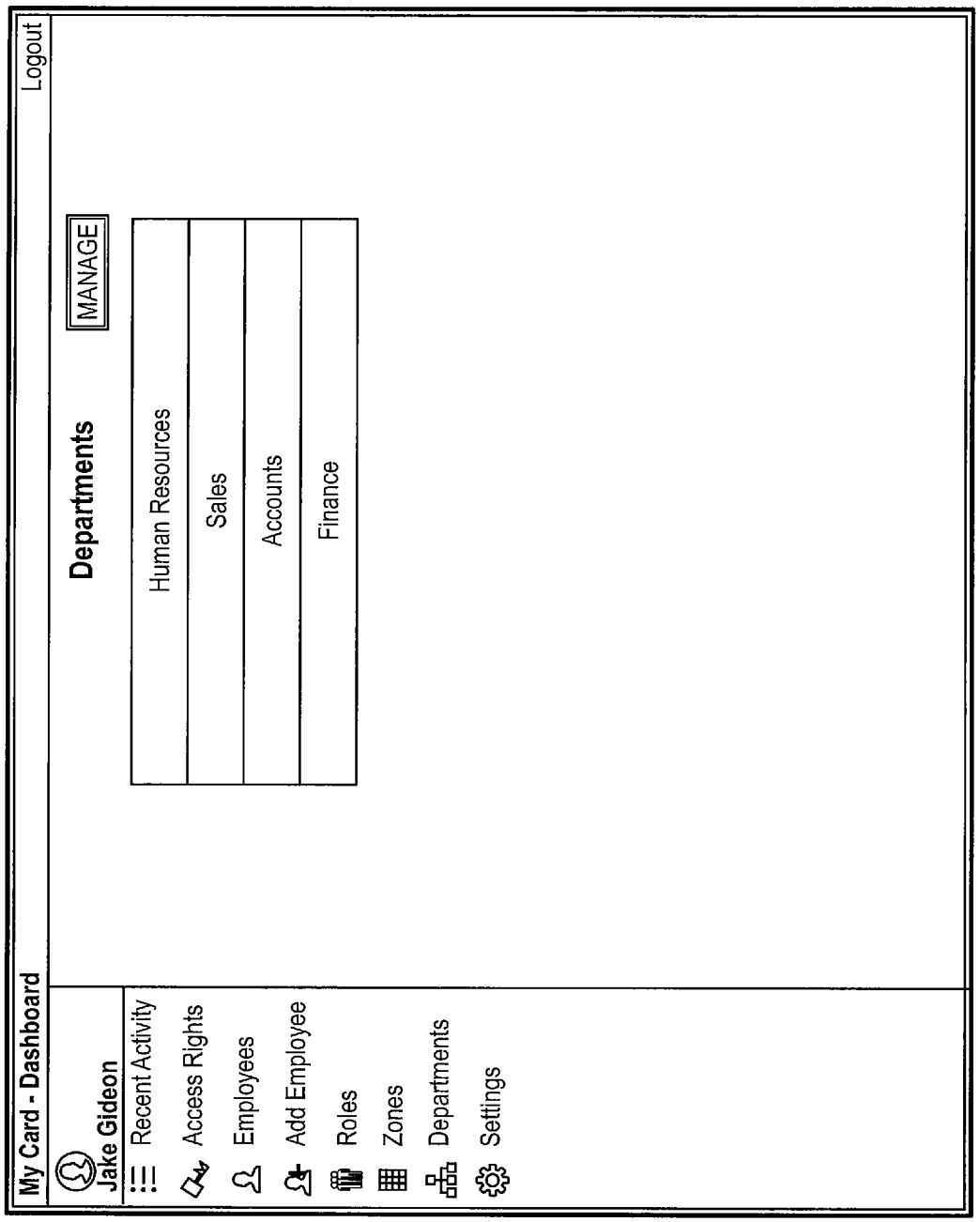
FIG. 25 illustrates an example of a user interface for access control and identification, according to one or more embodiments of the present disclosure.

The server device 120*a* and the sever device 120*b* can implement the functionality described herein via identification unit(s) 122*a* and identification unit(s) 122*b*. In some embodiments, as is illustrated in FIG. 1A, a server device 160 (which can embody or can include server device 120*a* or sever device 120*b*) can include one or more memory devices 164 having one or more access and identification components 166. The identification component(s) 166 can configure the server device 120*b* to provide the functionality described herein. In addition, in response to execution, the server device 120*b* can implement or otherwise provide the various functionalities described herein. The server device 160 can include one or more processors 172 that can execute the access and identification component(s) 166. In addition, the server device 160 can include or can be coupled to a display unit 168 that can present numerous interfaces that can permit administering access rules, addition of user devices, removal of user devices, and the like. In some aspects, as is illustrated in FIGS. 15, 16, 17, 18, 19, 20, and 21. The server device 160 can permit monitoring recent activity, such as zones access activity and/or contact information exchange (e.g., card exchanges). In addition, as is illustrated in FIGS. 24-25, the server device 160 can permit create, controlling and terminating zone access rights to zones controlled or otherwise configured by the server device 160 or other server devices in accordance with aspects of this disclosure.

Figure 22:
FIG. 22 illustrates an example of a user interface for access control and identification, according to one or more embodiments of the present disclosure.
Figure 23:
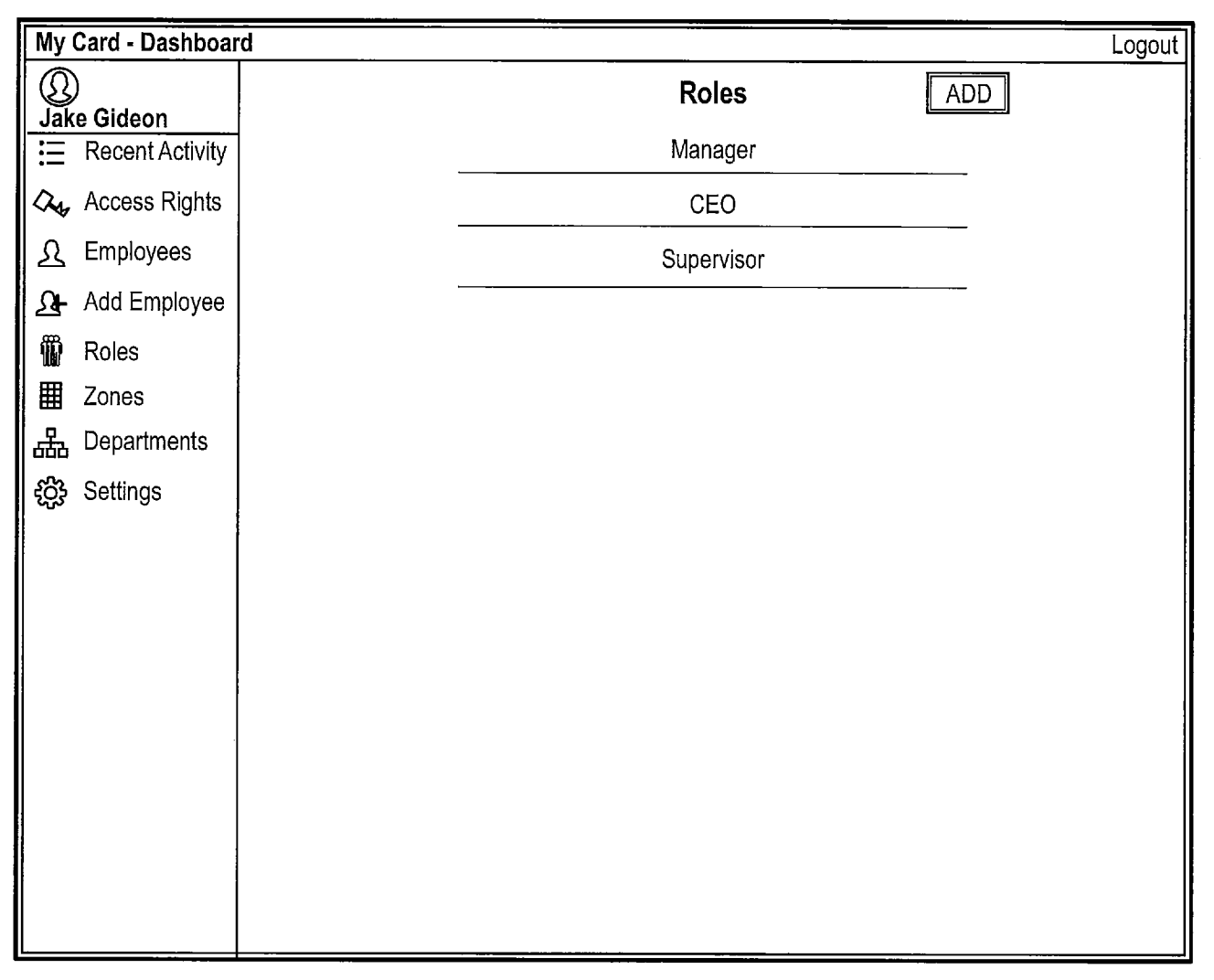

In other aspects, as is illustrated in FIGS. 22-23, the server device 160 can permit viewing all employees or other end-users for which a user profile is available within the user repository 150. The information that can be presented can include name, picture, email, department if applicable, address, fax number, and/or phone number.

Figure 24:
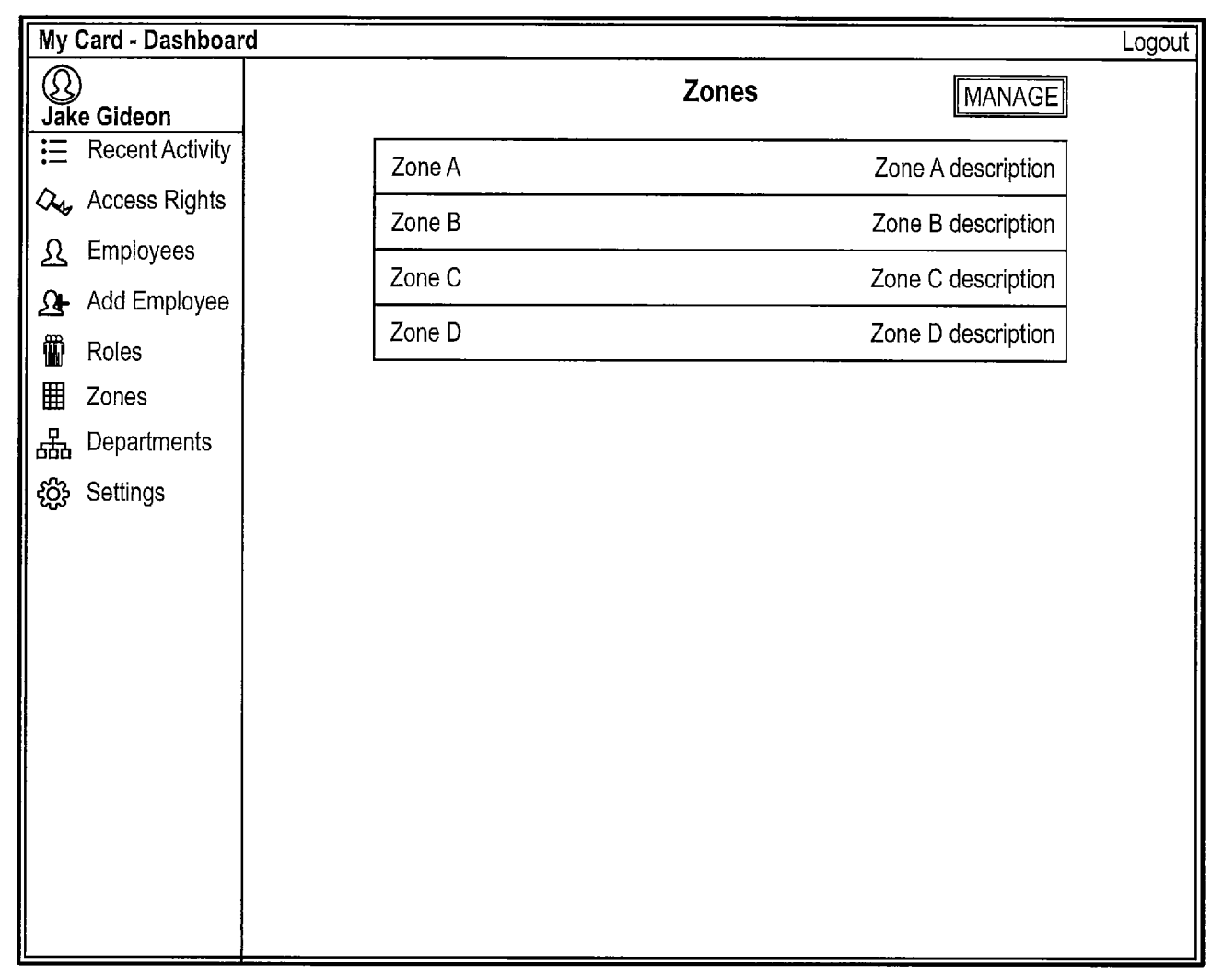

In still other aspects, as is illustrate in FIG. 24, the server device 160 can permit managing employees. For example the server device 160 can permit sending and updating access rights, deactivating user mobile devices, terminating zone access, uploading business cards for employees/users, and view employee's recent activity. In one aspect, a manager device can deactivate the user's zone access at any time by electing an option to "deactivate device". The manager may also manage the user's access rights.

Figure 27:
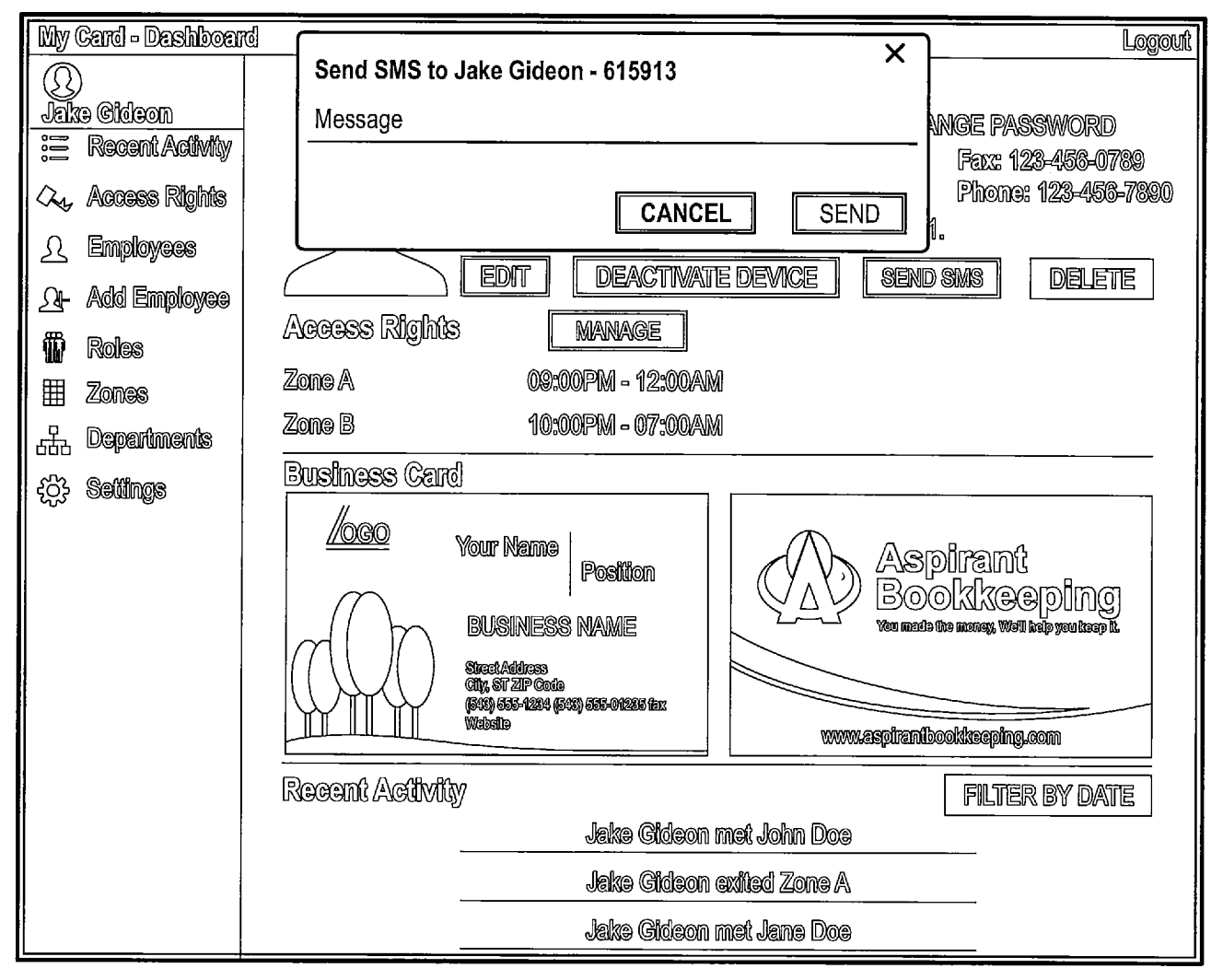
Figure 28:
FIG. 28 illustrates an example of a user interface for access control and identification, according to one or more embodiments of the present disclosure.

In other aspects, the server device 160 also can permit adding and creating employees/users and define their access levels to zones. See, for example, FIG. 21. In addition, as is illustrated in FIG. 23, the server device 160 can permit creating roles for employees/users within an organization that leverages or otherwise utilizes the server devices in accordance with this disclosure. Similarly, as is illustrated in FIG. 25, the server device 160 can permit creating departments for employees/users within an organization that leverages or otherwise utilizes the server devices in accordance with this disclosure. Further as describe herein, the server device 160 can permit or otherwise facilitate zone creation and defining zone access rights. In addition, the server device also can permit, via at least a user interface, editing company settings and/or adding new managers authorized to operate the web app. Further, in some aspects, as is illustrated in FIGS. 28-27, the server device 160 can permit or otherwise facilitate sending messages to employees/clients mobile devices directly via SMS text message. Furthermore, as is also illustrated in FIGS. 27-28, the sever device 160 can generate access key for new user devices. Upon or Once a new user's profile has been created, the manager may send the access code to that individual's mobile device, activating all of their access keys to specified zones.

In addition, the server device 160 also can permit to login to access various functionalities remotely. Thus, the server device 160 can permit an end-user to log into a portal provide by the server device 160.

Figure 2:
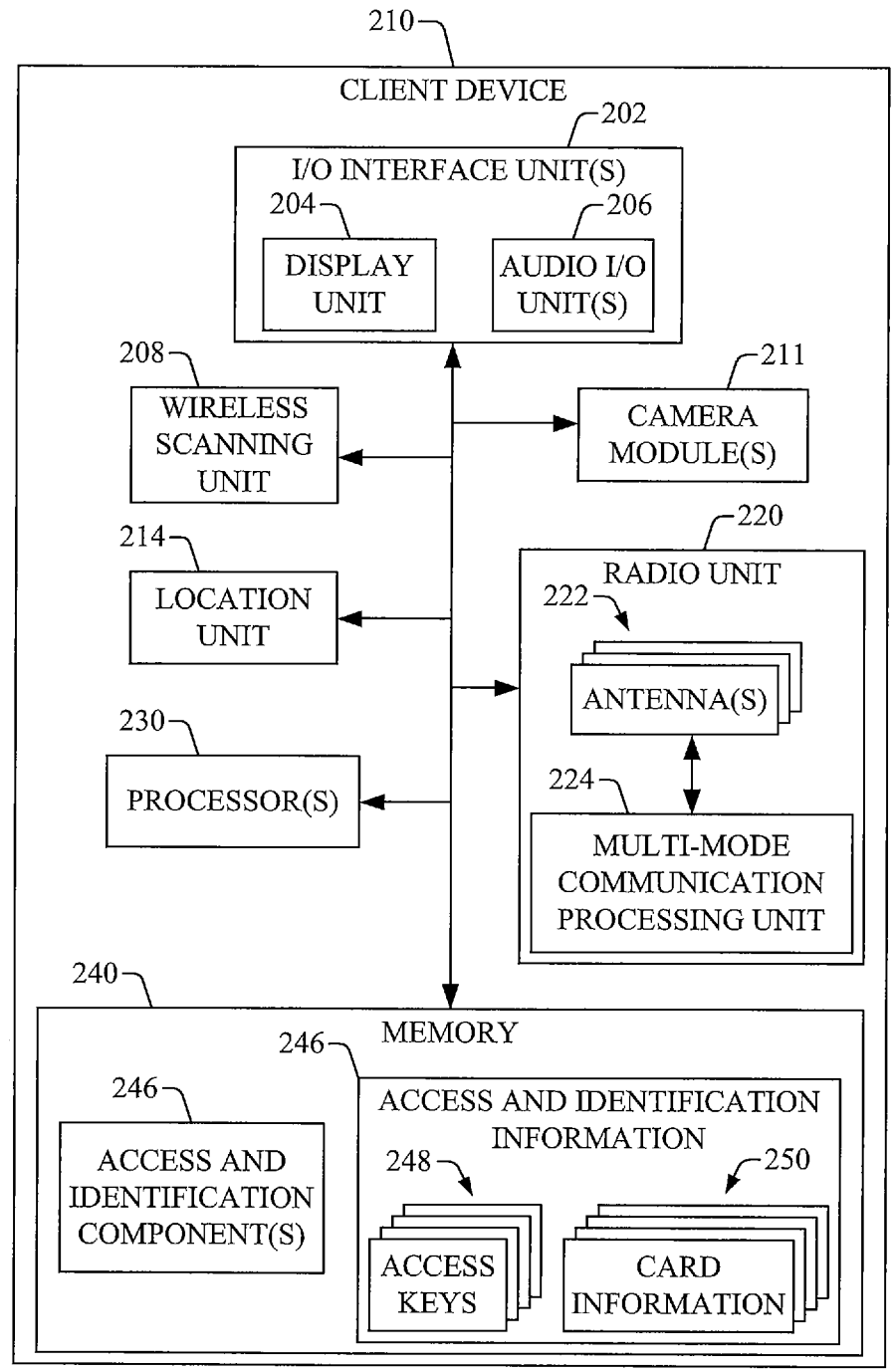
FIG. 2 presents an example of a client device for access control and identification of user devices, according to one or more embodiments of the present disclosure.

FIG. 2 illustrates an example of a client device 210 for access control and identification, according to one or more embodiments of this disclosure. The client device 210 can include one or more input/output (I/O) units 202 that can permit or otherwise facilitate receiving input information at the client device 210. To that end, in one embodiment, the I/O interface unit(s) 202 can include a display unit 204. In addition or in another embodiment, the client device 210 can include an audio input unit and an audio output unit (collectively referred to as audio I/O unit(s) 206. Further or in yet other embodiments, the client device 210 can include one or more camera modules 210. At least one of the camera module(s) 210 can permit or otherwise facilitate collecting information by focusing on an object (e.g., an image displayed on another client device) and generating a digital image of at least a portion of the object.

Figure 3:
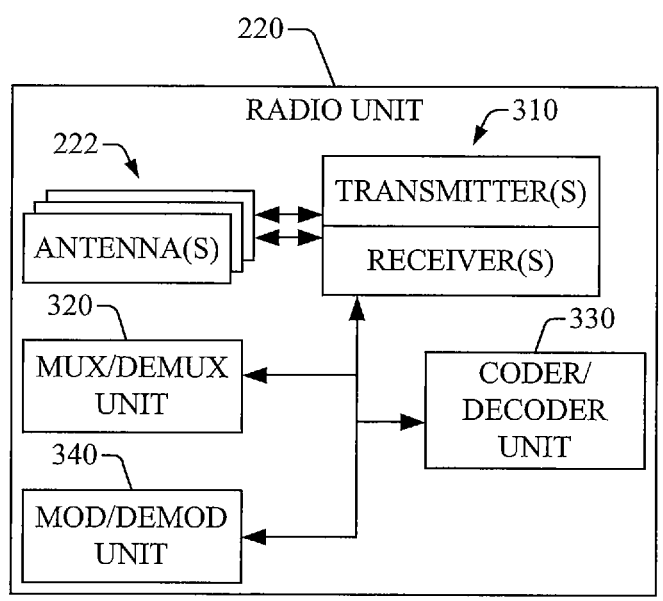
FIG. 3 presents an example of a radio unit in accordance with one or more embodiments of the disclosure.

The client device 210 also can include a wireless scanning unit 208 that can generate pilot signals (e.g., beacon signals) that can be transmitted wirelessly, for example, by means of a radio unit 220 (also referred to as radio 220). To that end, the radio unit 220 can include one or more antennas 222 functionally coupled to a multi-mode communication processing unit 324. The radio unit 210, via the multi-mode communication processing unit 224, can process the pilot signals according to one or more defined protocols of a radio technology. The radio technology can include, for example, 3G, Long Term Evolution (LTE), LTE-Advanced, 5G, IEEE 802.11, IEEE 802.16, Bluetooth, ZigBee, or near-field communication (NFC), or the like. At least one of the antenna(s) 222 can send wirelessly the processed pilot signals. As is illustrated in FIG. 3, in some embodiments, the radio unit 220 can include the antenna(s) 222, and one or more transmitters and one or more receivers, collectively referred to as transceiver(s) 310. In addition, the radio unit 220 can include a multiplexer/demultiplexer 320, a coder/decoder (codec) unit 330, and a modulator/demodulator (modem) unit 340. More specifically, in certain embodiments, the antenna(s) 222 can be embodied in or can include directional or omnidirectional antennas, including, for example, dipole antennas, monopole antennas, patch antennas, loop antennas, microstrip antennas or other types of antennas suitable for transmission of RF signals. In addition, or in other embodiments, at least some of the antenna(s) 222 can be physically separated to leverage spatial diversity and related different channel characteristics associated with such diversity. In addition or in other embodiments, the multi-mode communication processing unit 224 can process at least wireless signals in accordance with one or more radio technology protocols and/or modes (such as MIMO, single-input-multiple-output (SIMO), multiple-input-single-output (MISO), and the like. Each of such protocol(s) can be configured to communicate (e.g., transmit, receive, or exchange) data, metadata, and/or signaling over a specific air interface. The one or more radio technology protocols can include 3.sup.rd Generation Partnership Project (3GPP) Universal Mobile Telecommunication System (UMTS); 3GPP Long Term Evolution (LTE); LTE Advanced (LTE-A); Wi-Fi protocols, such as those of the Institute of Electrical and Electronics Engineers (IEEE) 802.11 family of standards; Worldwide Interoperability for Microwave Access (WiMAX); radio technologies and related protocols for ad hoc networks, such as Bluetooth or ZigBee; other protocols for packetized wireless communication; or the like). The multi-mode communication processing unit 224 also can process non-wireless signals (analogic, digital, a combination thereof, or the like). While illustrated as separate blocks in the computing device 210, it should be appreciated that in certain embodiments, at least a portion of the multi-mode communication processing unit 224 and the communication unit 224 can be integrated into a single unit (e.g., a single chipset or other type of solid state circuitry).

In one embodiment, e.g., example embodiment shown in FIG. 3, the multi-mode communication processing unit 222 can comprise a set of one or more transmitters/receivers 304, and components therein (amplifiers, filters, analog-to-digital (A/D) converters, etc.), functionally coupled to a multiplexer/demultiplexer (mux/demux) unit 308, a modulator/demodulator (mod/demod) unit 316 (also referred to as modem 316), and a coder/decoder unit 312 (also referred to as codec 312). Each of the transmitter(s)/receiver(s) can form respective transceiver(s) that can transmit and receive wireless signal (e.g., electromagnetic radiation) via the one or more antennas 222. It should be appreciated that in other embodiments, the multi-mode communication processing unit 224 can include other functional elements, such as one or more sensors, a sensor hub, an offload engine or unit, a combination thereof, or the like.

Electronic components and associated circuitry, such as mux/demux unit 308, codec 312, and modem 316 can permit or facilitate processing and manipulation, e.g., coding/decoding, deciphering, and/or modulation/demodulation, of signal(s) received by the computing device 210 and signal(s) to be transmitted by the computing device 210. In one aspect, as described herein, received and transmitted wireless signals can be modulated and/or coded, or otherwise processed, in accordance with one or more radio technology protocols. Such radio technology protocol(s) can include 3GPP UMTS; 3GPP LTE; LTE-A; Wi-Fi protocols, such as the IEEE 802.11 family of standards (IEEE 802.ac, IEEE 802.ax, and the like); WiMAX; radio technologies and related protocols for ad hoc networks, such as Bluetooth or ZigBee; other protocols for packetized wireless communication; or the like. The electronic components in the described communication unit, including the one or more transmitters/receivers 304, can exchange information (e.g., data, metadata, code instructions, signaling and related payload data, combinations thereof, or the like) through a bus 314, which can embody or can comprise at least one of a system bus, an address bus, a data bus, a message bus, a reference link or interface, a combination thereof, or the like. Each of the one or more receivers/transmitters 304 can convert signal from analog to digital and vice versa. In addition or in the alternative, the receiver(s)/transmitter(s) 304 can divide a single data stream into multiple parallel data streams, or perform the reciprocal operation. Such operations may be conducted as part of various multiplexing schemes. As illustrated, the mux/demux unit 308 is functionally coupled to the one or more receivers/transmitters 304 and can permit processing of signals in time and frequency domain. In one aspect, the mux/demux unit 308 can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), or space division multiplexing (SDM). In addition or in the alternative, in another aspect, the mux/demux unit 308 can scramble and spread information (e.g., codes) according to most any code, such as Hadamard-Walsh codes, Baker codes, Kasami codes, polyphase codes, and the like. The modem 316 can modulate and demodulate information (e.g., data, metadata, signaling, or a combination thereof) according to various modulation techniques, such as frequency modulation (e.g., frequency-shift keying), amplitude modulation (e.g., Q-ary quadrature amplitude modulation (QAM), with Q a positive integer; amplitude-shift keying (ASK)), phase-shift keying (PSK), and the like). In addition, processor(s) that can be included in the computing device 310 (e.g., processor(s) included in the radio unit 224 or other functional element(s) of the computing device 210) can permit processing data (e.g., symbols, bits, or chips) for multiplexing/demultiplexing, modulation/demodulation (such as implementing direct and inverse fast Fourier transforms), selection of modulation rates, selection of data packet formats, inter-packet times, and the like.

The codec 312 can operate on information (e.g., data, metadata, signaling, or a combination thereof) in accordance with one or more coding/decoding schemes suitable for communication, at least in part, through the one or more transceivers formed from respective transmitter(s)/receiver(s) 304. In one aspect, such coding/decoding schemes, or related procedure(s), can be retained as a group of one or more computer-accessible instructions (computer-readable instructions, computer-executable instructions, or a combination thereof) in one or more memory devices 240 (referred to as memory 240). In a scenario in which wireless communication among the computing device 210 and another computing device (e.g., a station or other type of user equipment) utilizes MIMO, MISO, SIMO, or SISO operation, the codec 312 can implement at least one of space-time block coding (STBC) and associated decoding, or space-frequency block coding (SFBC) coding and associated decoding. In addition or in the alternative, the codec 312 can extract information from data streams coded in accordance with spatial multiplexing scheme. In one aspect, to decode received information (e.g., data, metadata, signaling, or a combination thereof), the codec 312 can implement at least one of computation of log-likelihood ratios (LLRs) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec 312 can utilize, at least in part, mux/demux unit 308 and mod/demod unit 316 to operate in accordance with aspects described herein.

Figure 29:
FIG. 29 illustrates an example of a user interface for access control and identification, according to one or more embodiments of the present disclosure.

As is illustrated by FIG. 29, the client device 210 can be utilized as a digital ID badge for an end-user. To that end, the display unit 204 can present There may be multiple ID badges stored within MyCard. For example, a user may have their digital work ID badge and government driver's license saved. In one aspect, the proper ID may be displayed as needed. A badge cannot be altered by a mobile user. Further, as is illustrated by FIGS. 49, 50, 51, 52, and 43, and as is described herein, the client device 210 can be utilized as an access key. Digital business and/or contact card creation, exchange, storage and interactivity mobile app. Cards may be exchanged from mobile device to mobile device using wireless connections such as for e.g., NFC, Bluetooth, SMS text messages, and/or email. The exchanged card may be uploaded into the receiving MyCard mobile app and saved in the app's contact list. This contact's profile may now contain that contact's digital business card, the GPS location of the exchange, date and time of the exchange, and any notes the receiving user wanted to add on their new contact.

Figure 14:
FIG. 14 illustrates an example of a user interface for access control and identification, according to one or more embodiments of the present disclosure.
Figure 18:
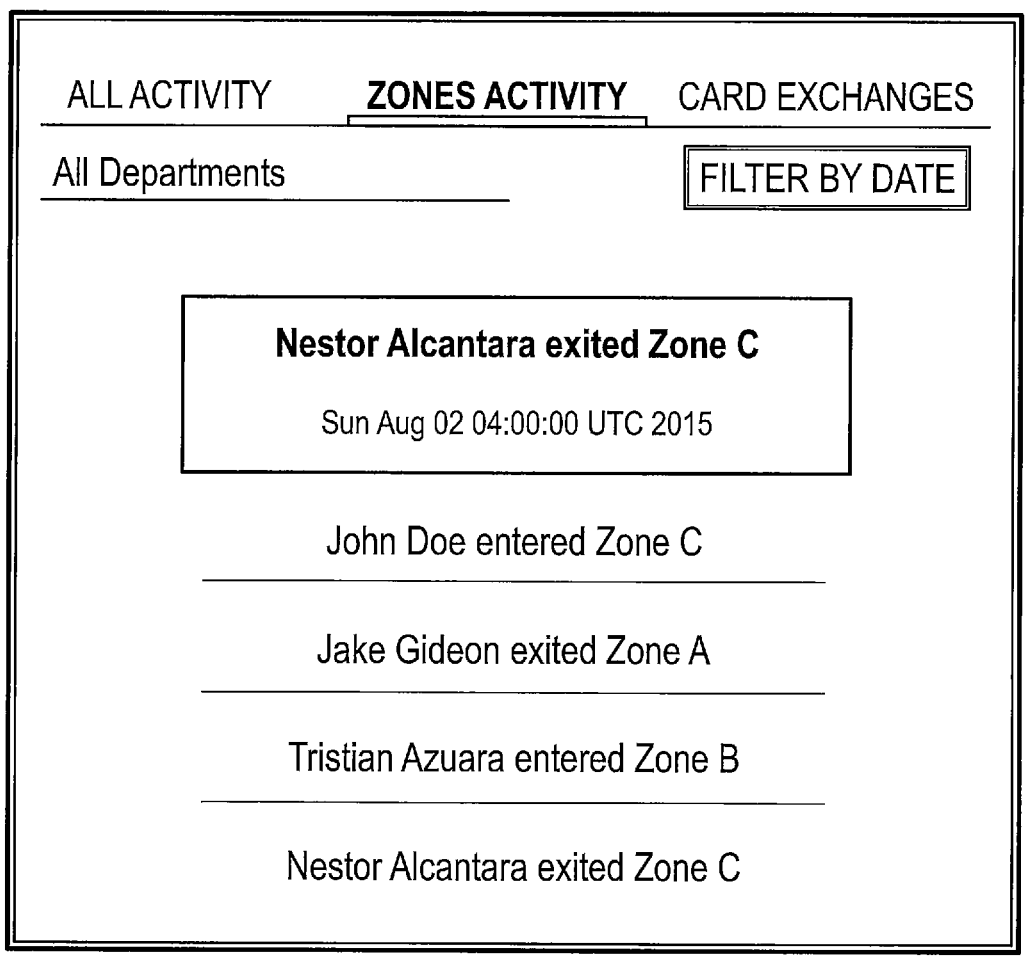
FIG. 18 illustrates an example of a user interface for access control and identification, according to one or more embodiments of the present disclosure.
Figure 19:
FIG. 19 illustrates an example of a user interface for access control and identification, according to one or more embodiments of the present disclosure.
Figure 20:
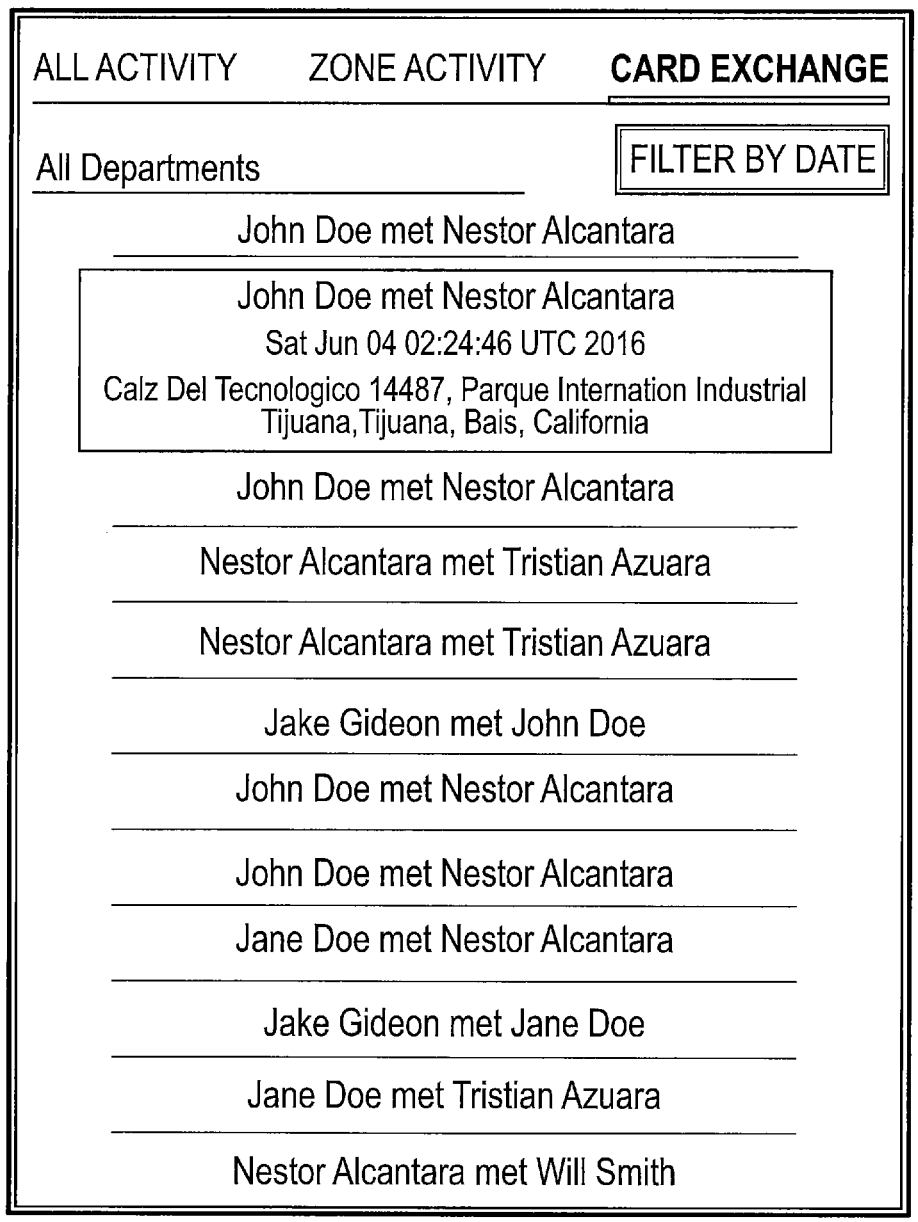
FIG. 20 illustrates an example of a user interface for access control and identification, according to one or more embodiments of the present disclosure.

In some aspects, the client device 210 and other client devices described herein can serve a business card, as is illustrated in FIG. 14. The user may either upload a file of an existing physical business card to the mobile app, or create his or her own contact card within the mobile app. The functionality provided by the access and identification component(s) 246 can be activated in accordance with aspects described herein. After or upon activation, the client device can begin receiving access keys and ID badges from the web app.

Figure 30:
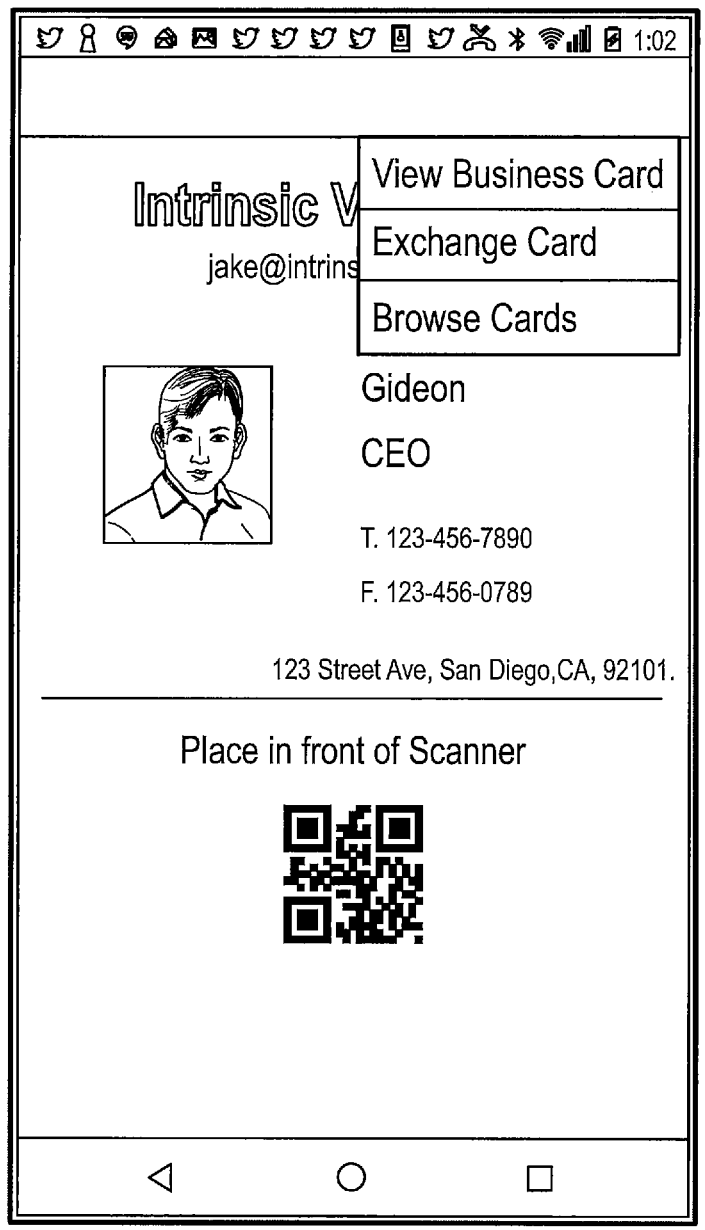
FIG. 30 illustrates an example of a user interface for access control and identification, according to one or more embodiments of the present disclosure.
Figure 31:
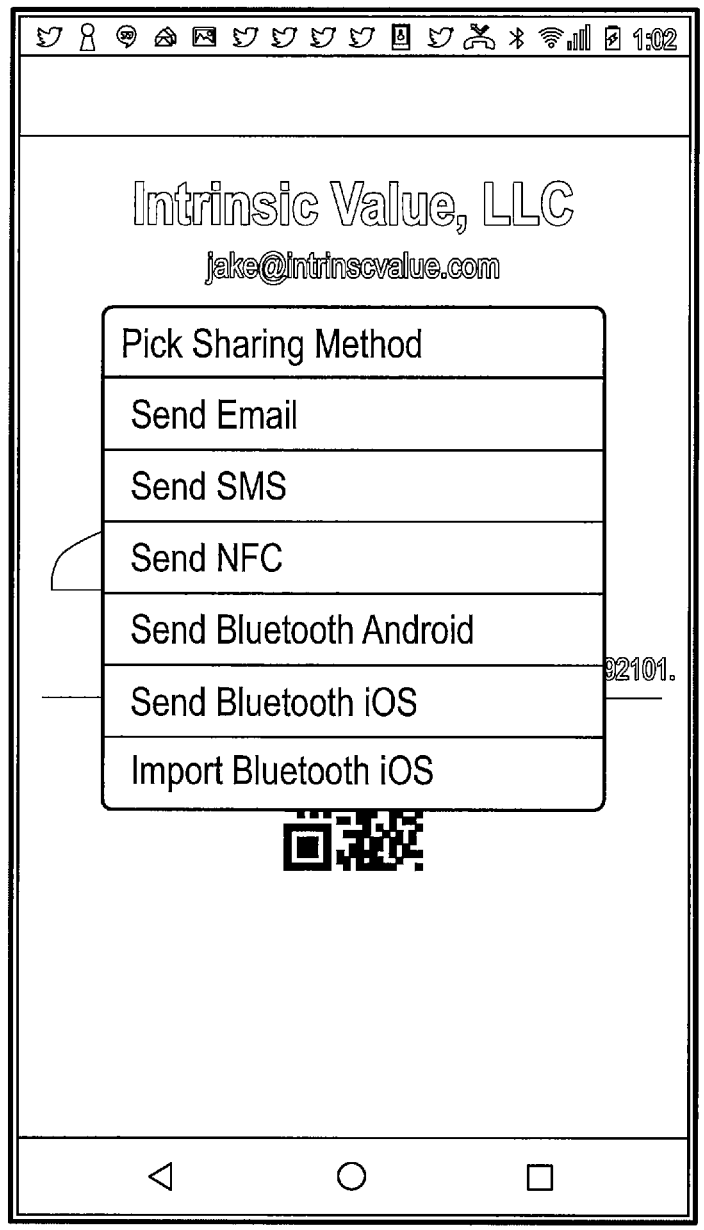
FIG. 31 illustrates an example of a user interface for access control and identification, according to one or more embodiments of the present disclosure.

In some aspects, as is illustrated in FIGS. 30-31, digital business card transfer via SMS, NFC, Bluetooth and/or email. Received cards may be stored, or uploaded directly to the MyCard mobile app. Cards (business or personal contact cards) may be created by either the manager (managing employees/clients) or the mobile user. In addition, as is illustrated in FIG. 30, exchanged contacts can be searched in a contact database, which can be retained in the client device 210 or remotely.'

Figure 32:
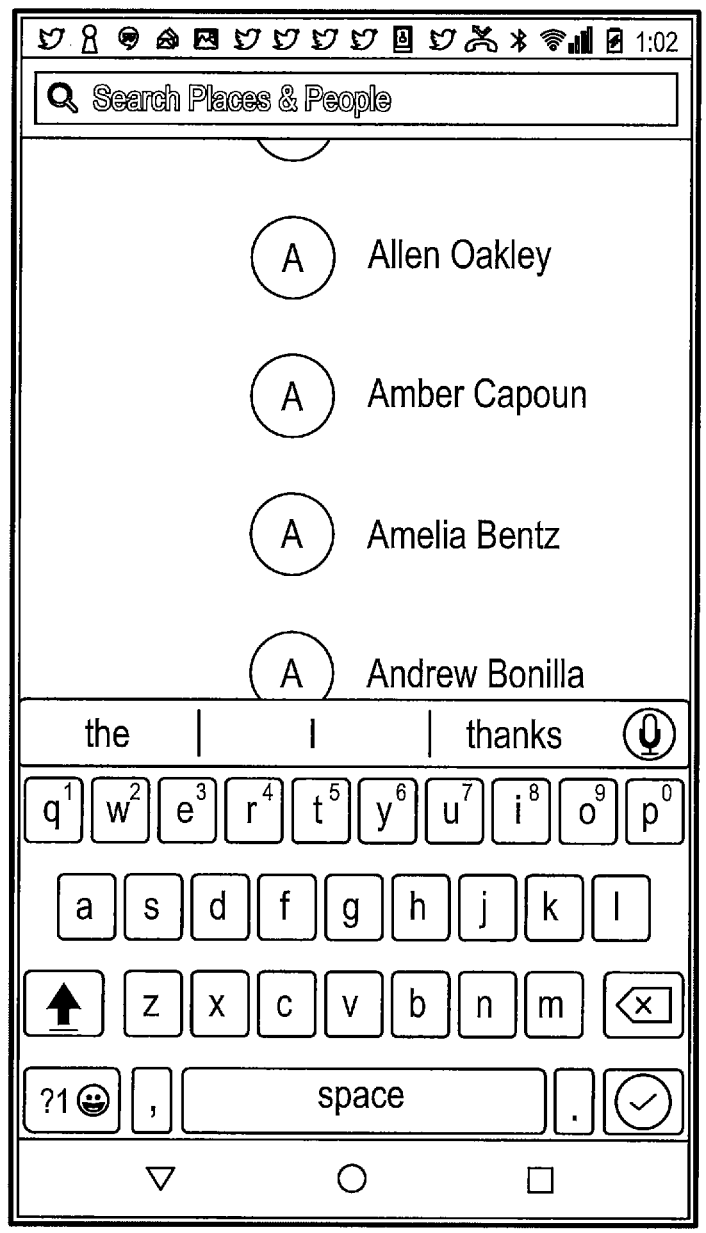
FIG. 32 illustrates an example of a user interface for access control and identification, according to one or more embodiments of the present disclosure.
Figure 34:
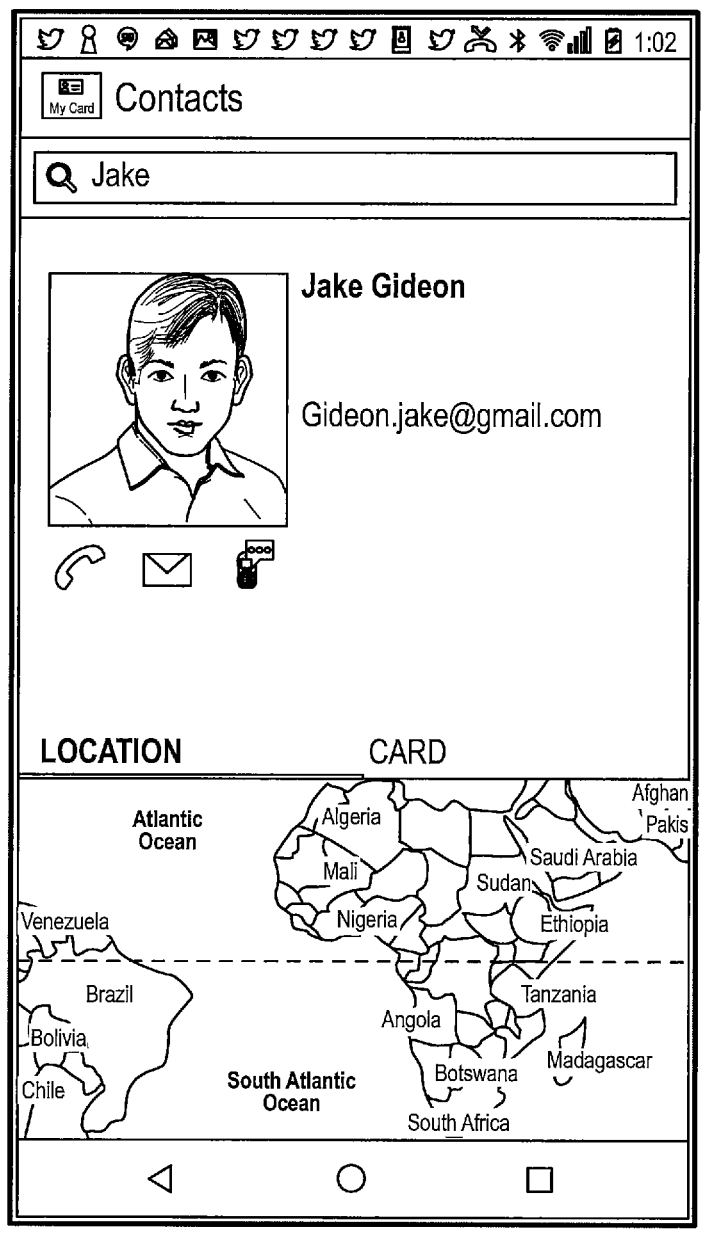
FIG. 34 illustrates an example of a user interface for access control and identification, according to one or more embodiments of the present disclosure.
Figure 35:
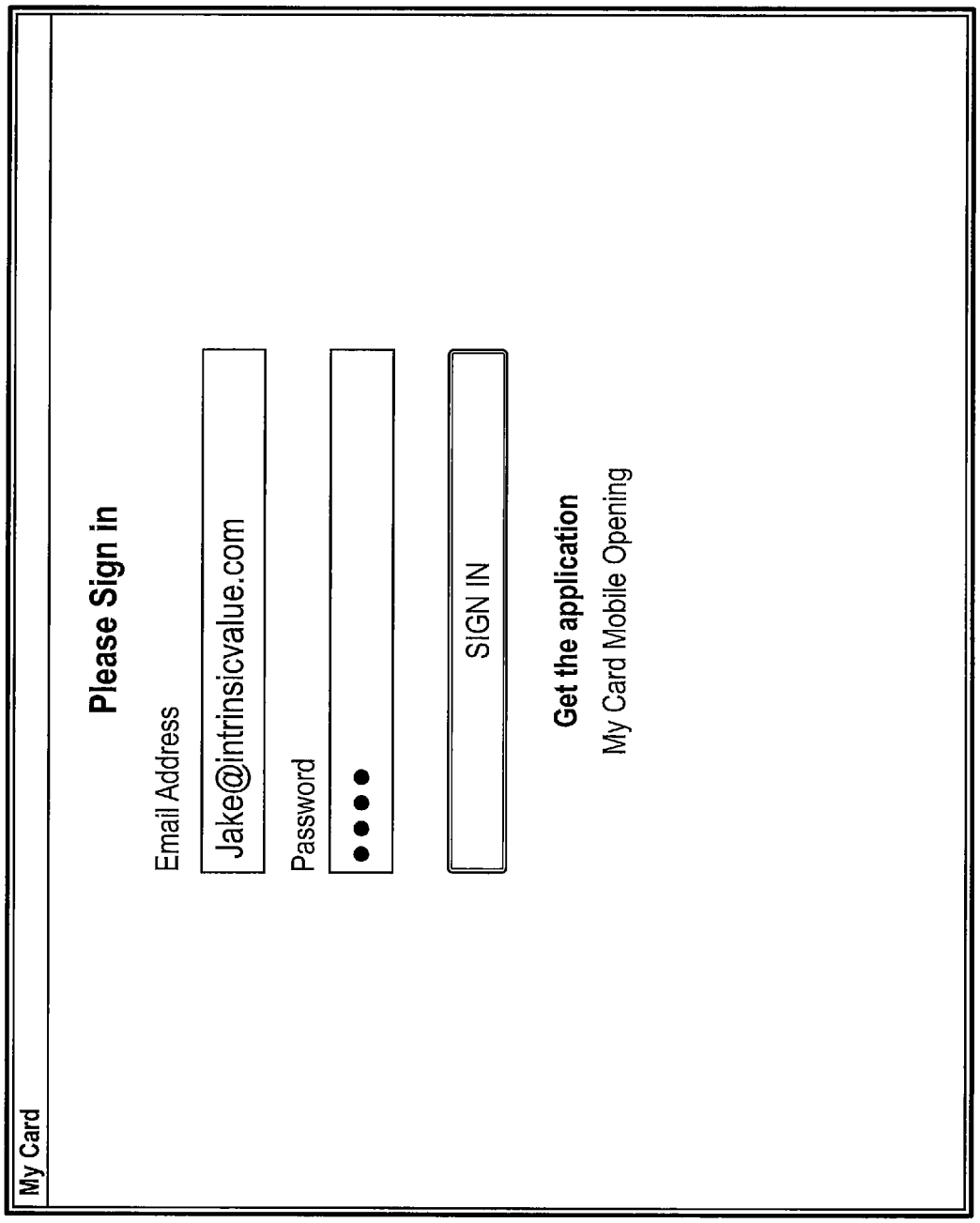
FIG. 35 illustrates an example of a user interface for access control and identification, according to one or more embodiments of the present disclosure.
Figure 36:
FIG. 36 illustrates an example of a user interface for access control and identification, according to one or more embodiments of the present disclosure.
Figure 37:
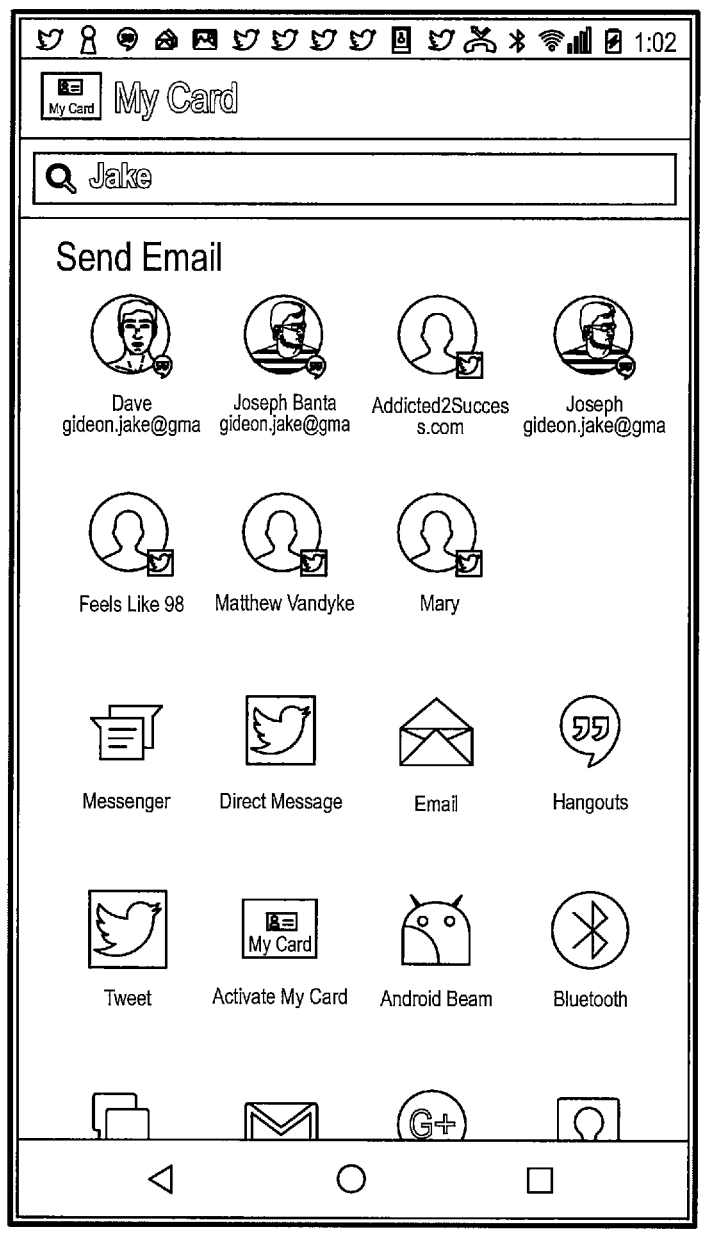
FIG. 37 illustrates an example of a user interface for access control and identification, according to one or more embodiments of the present disclosure.
Figures 38, 39:
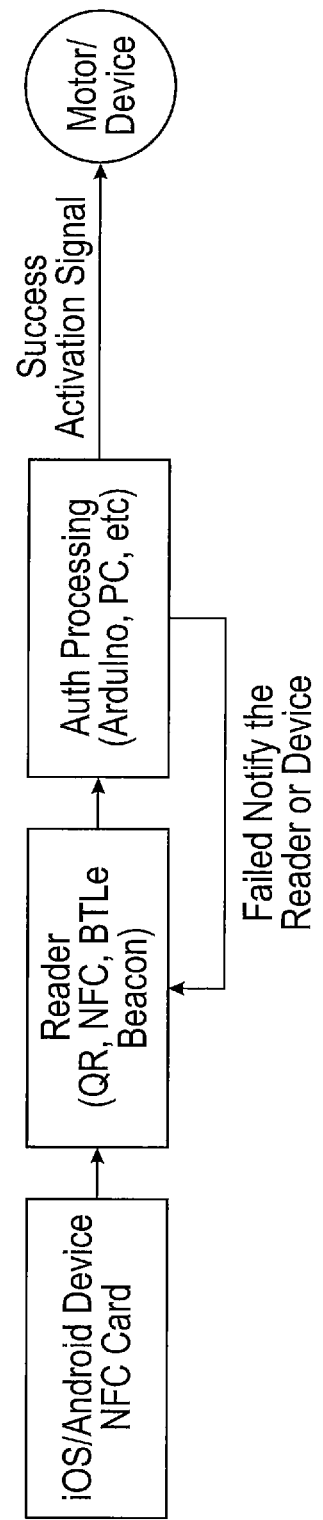
FIG. 38 illustrates an example of a user interface for access control and identification, according to one or more embodiments of the present disclosure.
FIG. 39 illustrates an example operation environment for access control and identification, according to one or more embodiments of the present disclosure.
Figure 40:
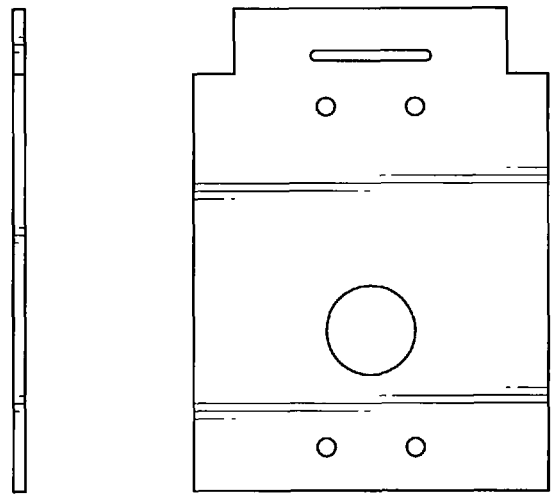
FIG. 40 illustrates views of a wall mount of a housing unit tied to an access control and identification system, according to one or more embodiments of the present disclosure.
Figure 41:
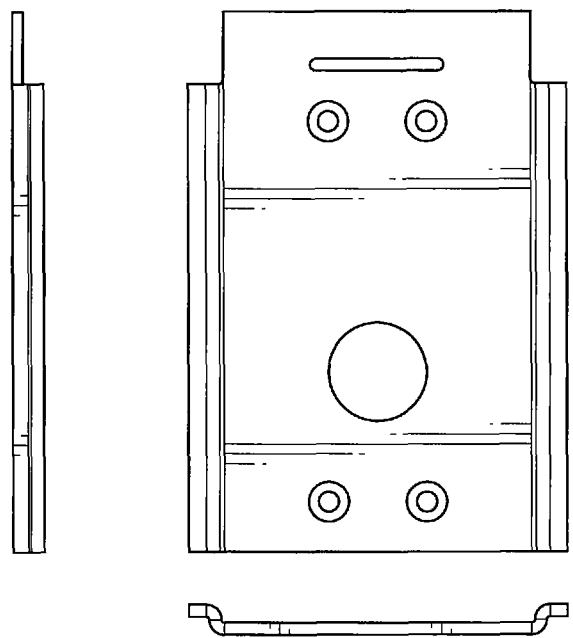
FIG. 41 illustrates views of a wall mount of a housing unit tied to an access control and identification, system according to an exemplary embodiment of the present disclosure.
Figure 42:
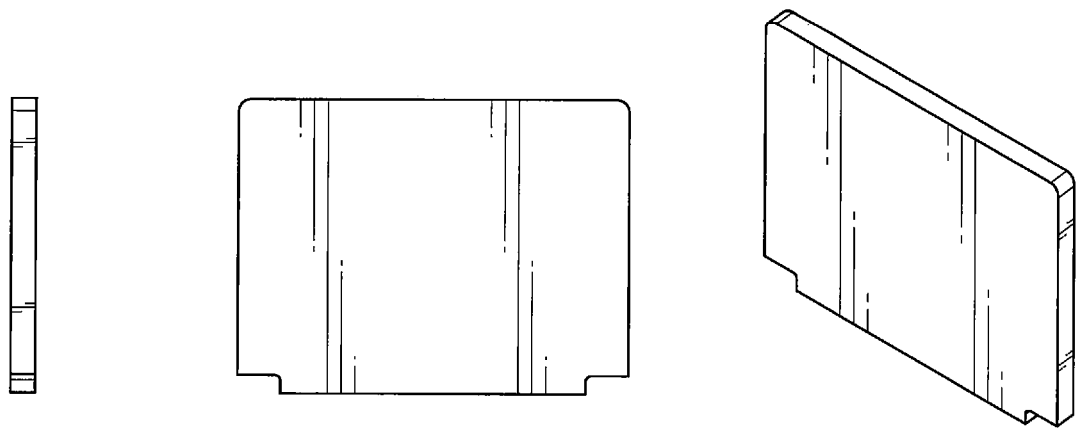
FIG. 42 illustrates views of a plate of a housing unit tied to an access control and identification system, according to an exemplary embodiment of the present disclosure.
Figure 43:
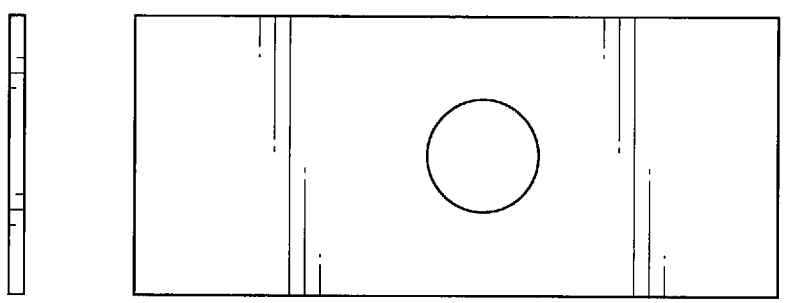
FIG. 43 illustrates views of a scanner mount of a housing unit tied to an access control and identification system, according to an exemplary embodiment of the present disclosure.
Figure 44:
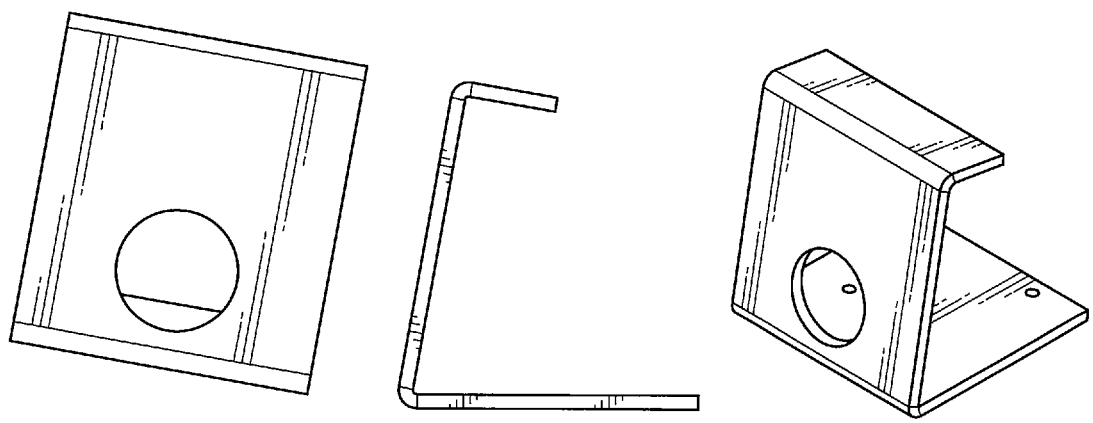
FIG. 44 illustrates views of a scanner mount of a housing unit tied to an access control and identification system, according to an exemplary embodiment of the present disclosure.
Figure 45:
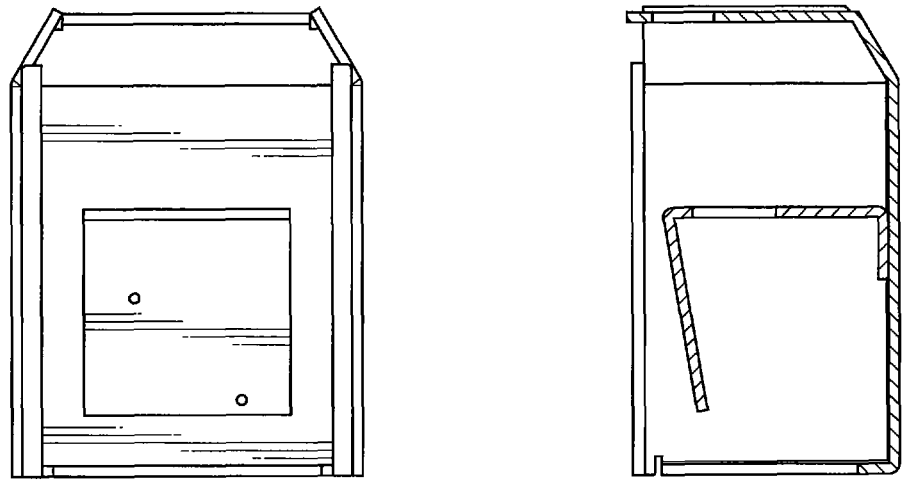
FIG. 45 illustrates views of a housing unit tied to an access control and identification system, according to an exemplary embodiment of the present disclosure.
Figure 46:
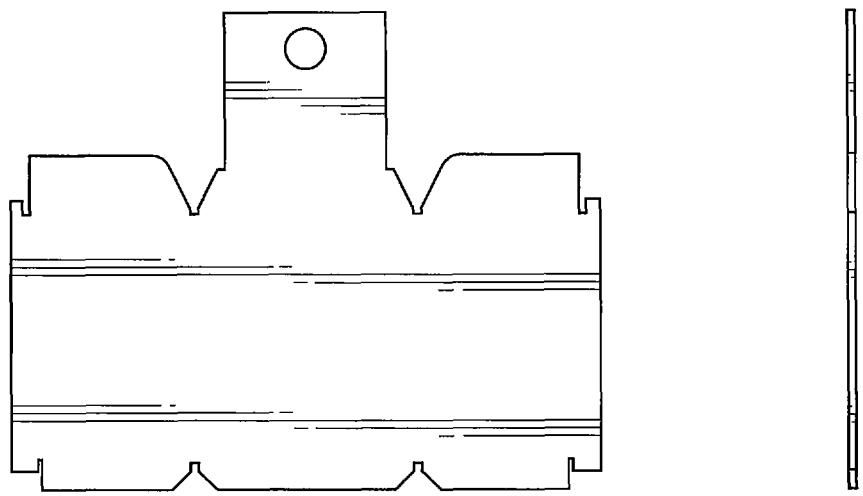
FIG. 46 illustrates views of a housing unit tied to an access control and identification system, according to an exemplary embodiment of the present disclosure.
Figure 47:
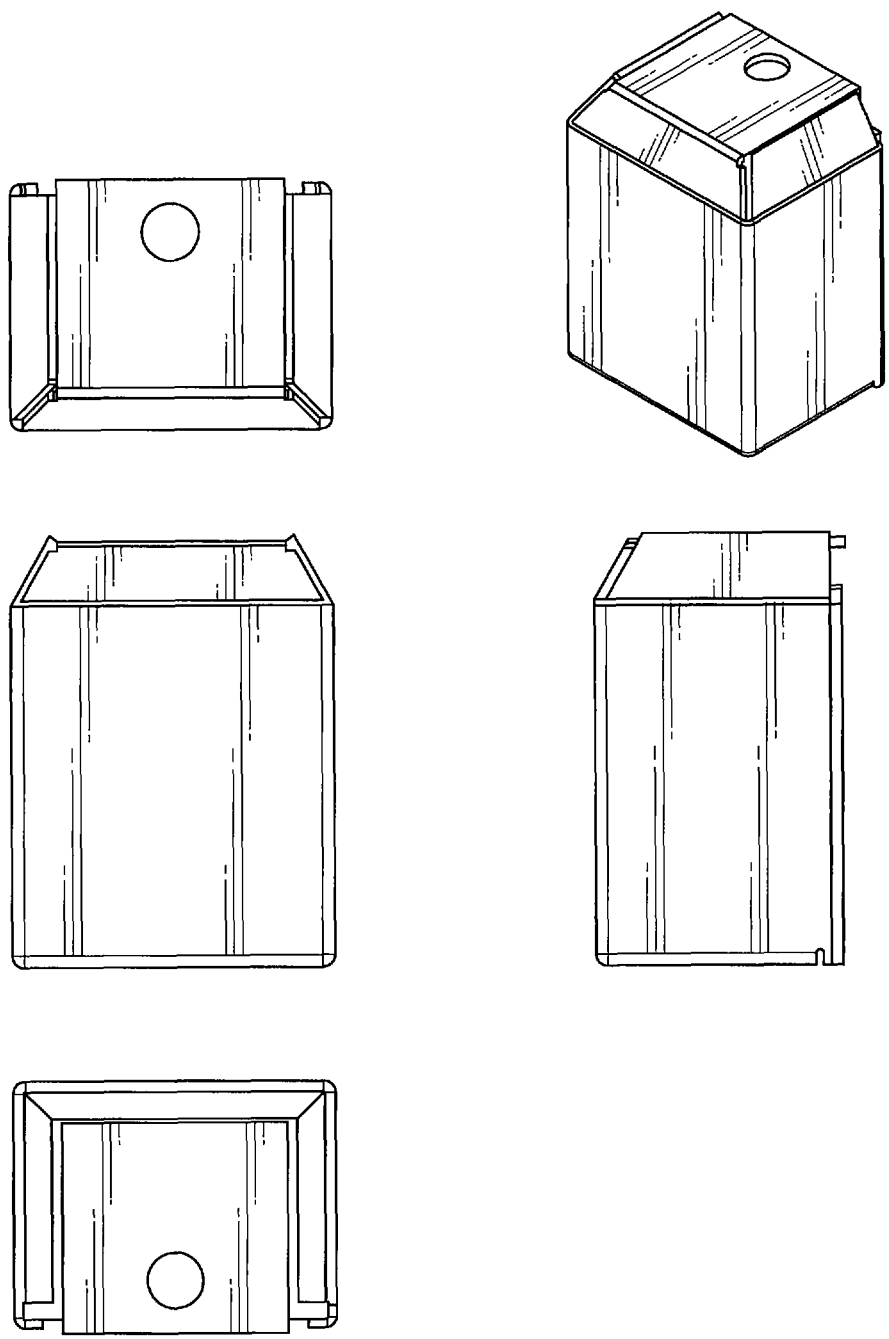
FIG. 47 includes views of a housing unit tied to an access control and identification system, according to an exemplary embodiment of the present disclosure.
Figure 48:
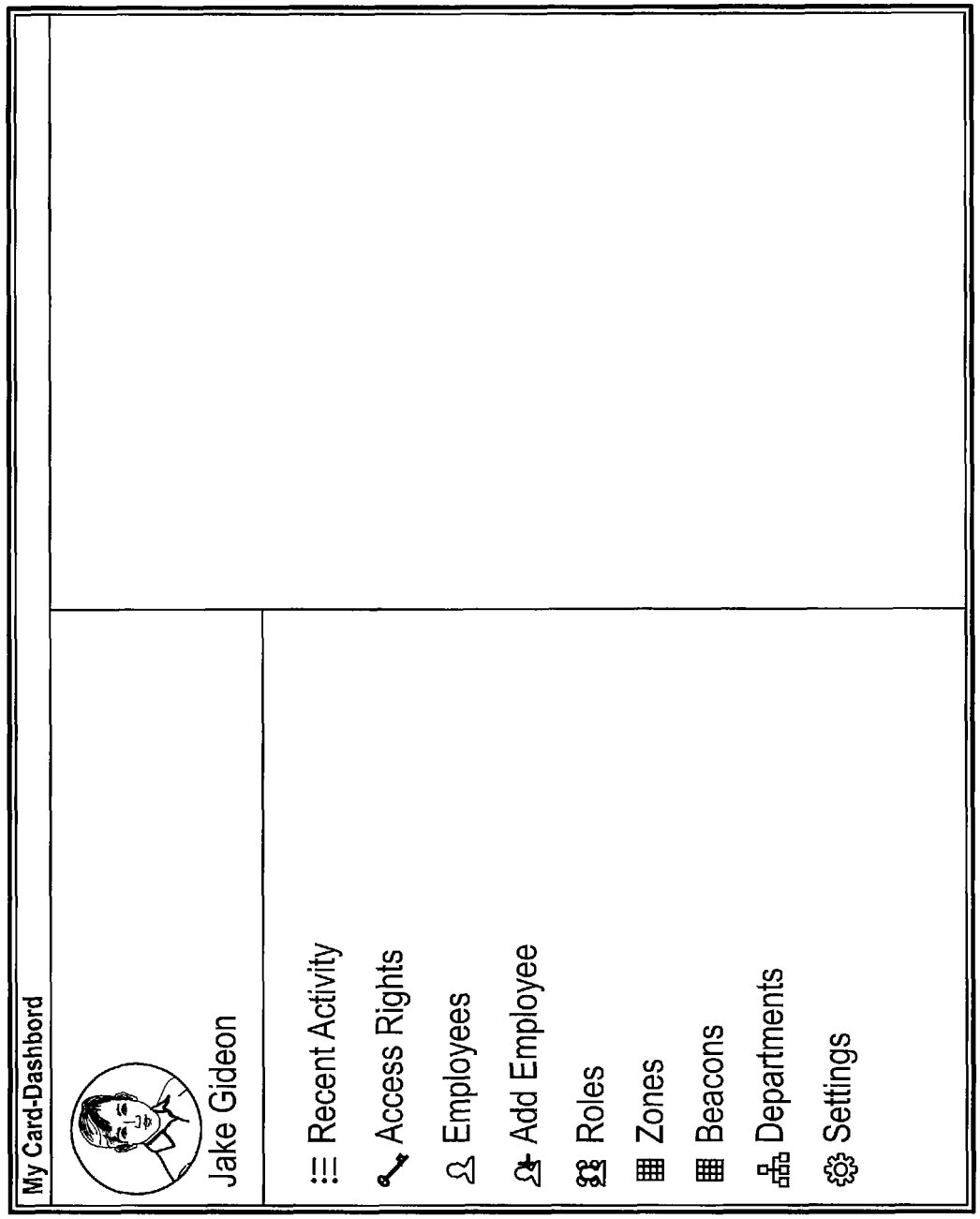
FIG. 48 illustrates an example of a user interface for access control and identification, according to one or more embodiments of the present disclosure.
Figure 49:
FIG. 49 illustrates an example of a user interface for access control and identification, according to one or more embodiments of the present disclosure.

In some embodiments, contact cards uploaded into the system may reflect date and time of the exchange, as well as GPS coordinates of the exact place where the exchange took place. In other embodiments, end-users may search for contact cards by people, places, organizations, dates/times, position/titles. In addition, as is illustrated in FIGS. 31, 32, the client device 210 can cause the display device 210 to present selectable visual elements representative of options for communication with other client devices. Users may communicate with contacts within the MyCard mobile app by for e.g., finding the contact they are searching for and emailing, calling, or texting that client, as well as viewing their business card and the GPS coordinates of where that exchange took place. See, for example, FIG. 34.

Figure 33:
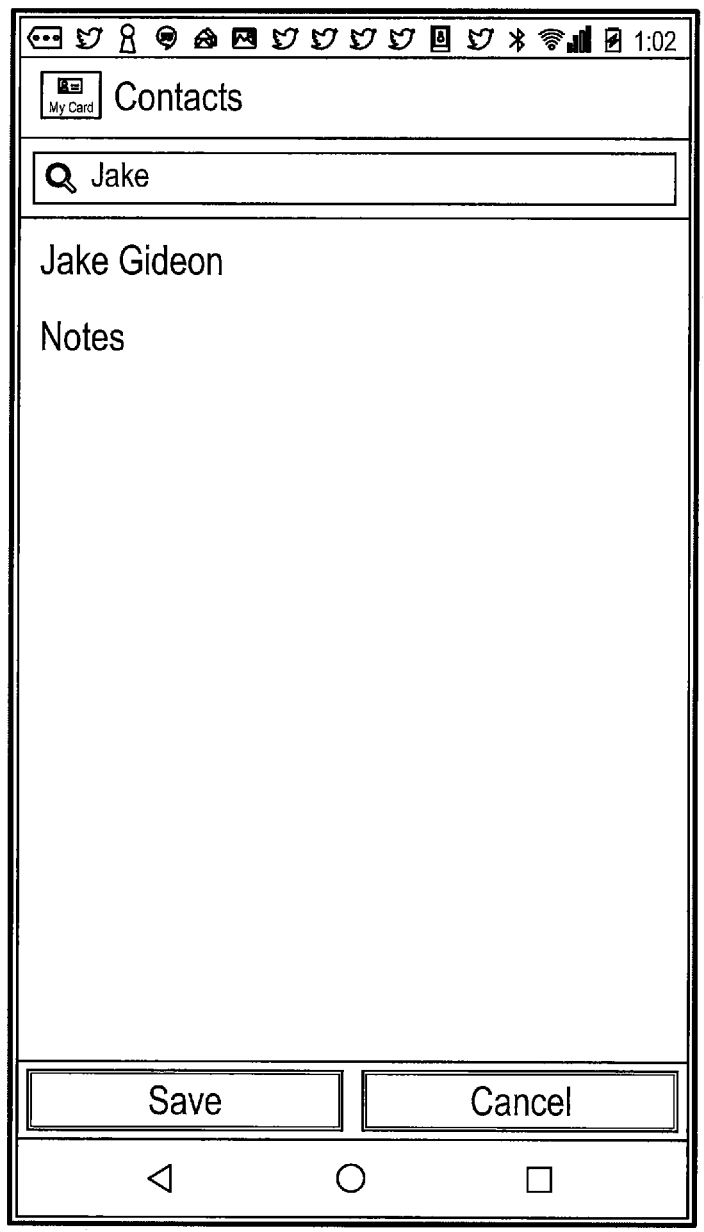
FIG. 33 illustrates an example of a user interface for access control and identification, according to one or more embodiments of the present disclosure.

In some aspects, as is illustrated in FIG. 33, upon or after receiving an exchanged contact card, users may add notes to the new contact—allowing the users to make a digital record of the exchange or meeting.

In some embodiments, cards may be exported/uploaded to an Excel, Apple numbers, or other type of spreadsheet. In addition, camera module(s) 211 can permit or otherwise facilitate taking a picture of a business card and scan that card image into their own existing card slot or apply it to the card slot of a person they just met and handed them a physical card.

Figure 50:
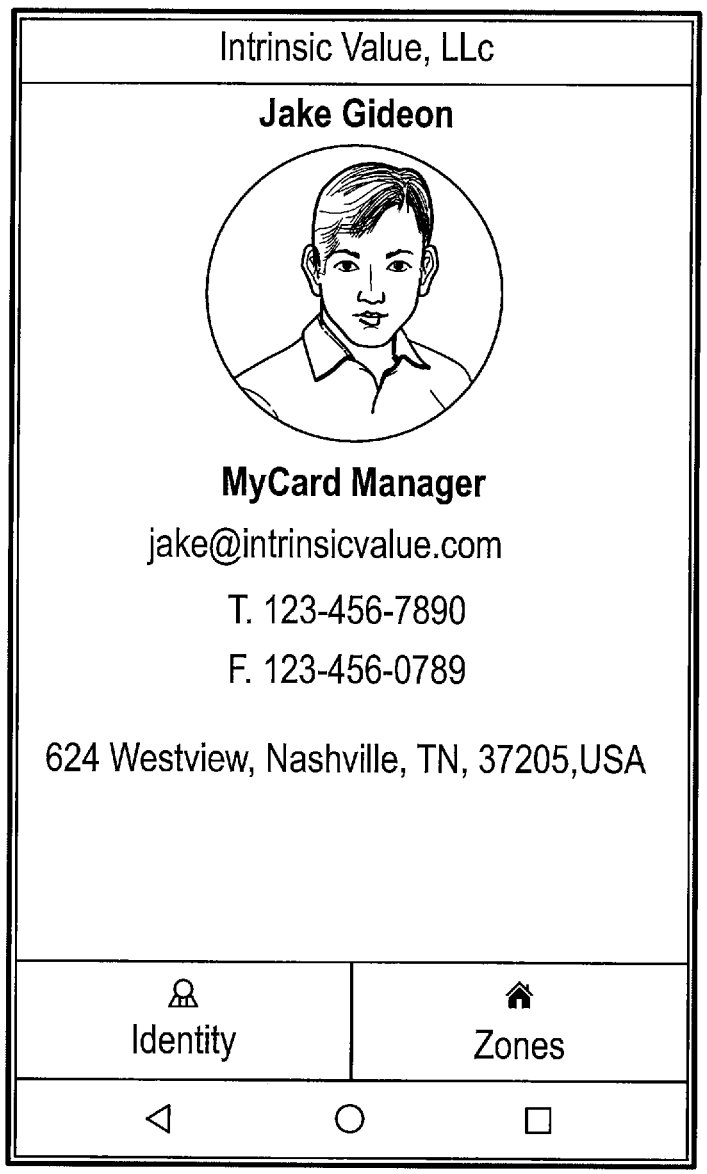
FIG. 50 illustrates an example of a user interface for access control and identification, according to one or more embodiments of the present disclosure.
Figure 51:
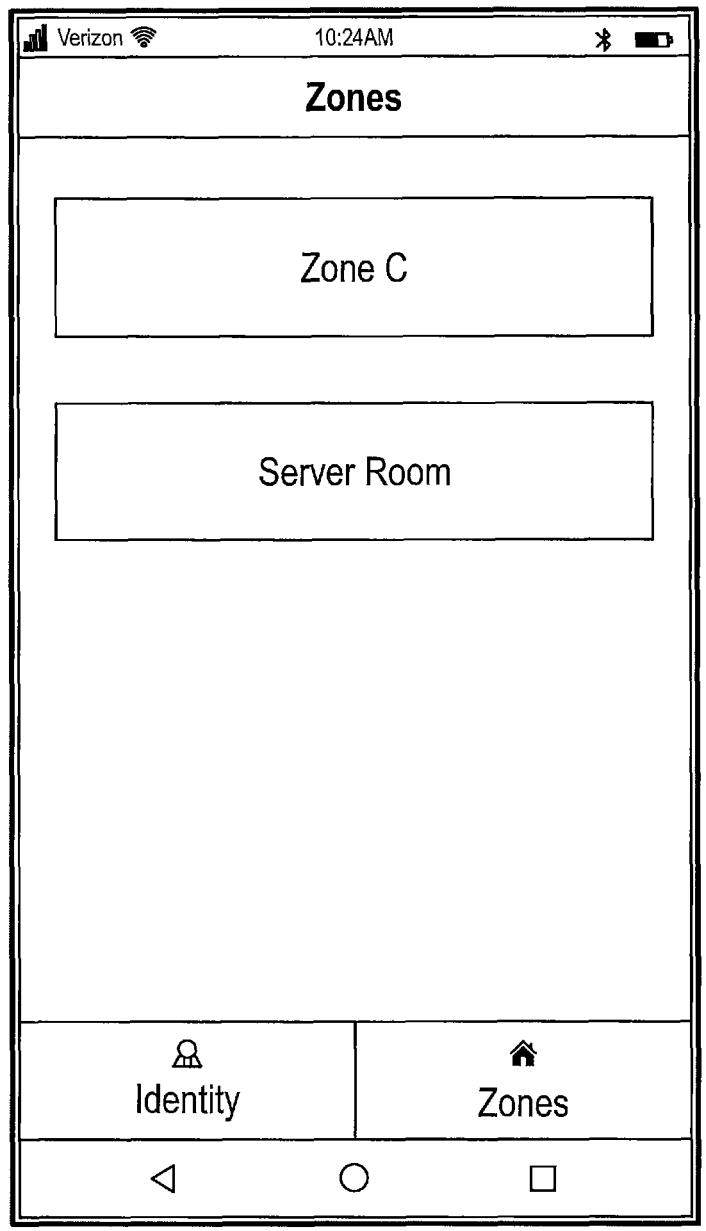
FIG. 51 illustrates an example of a user interface for access control and identification, according to one or more embodiments of the present disclosure.
Figure 52:
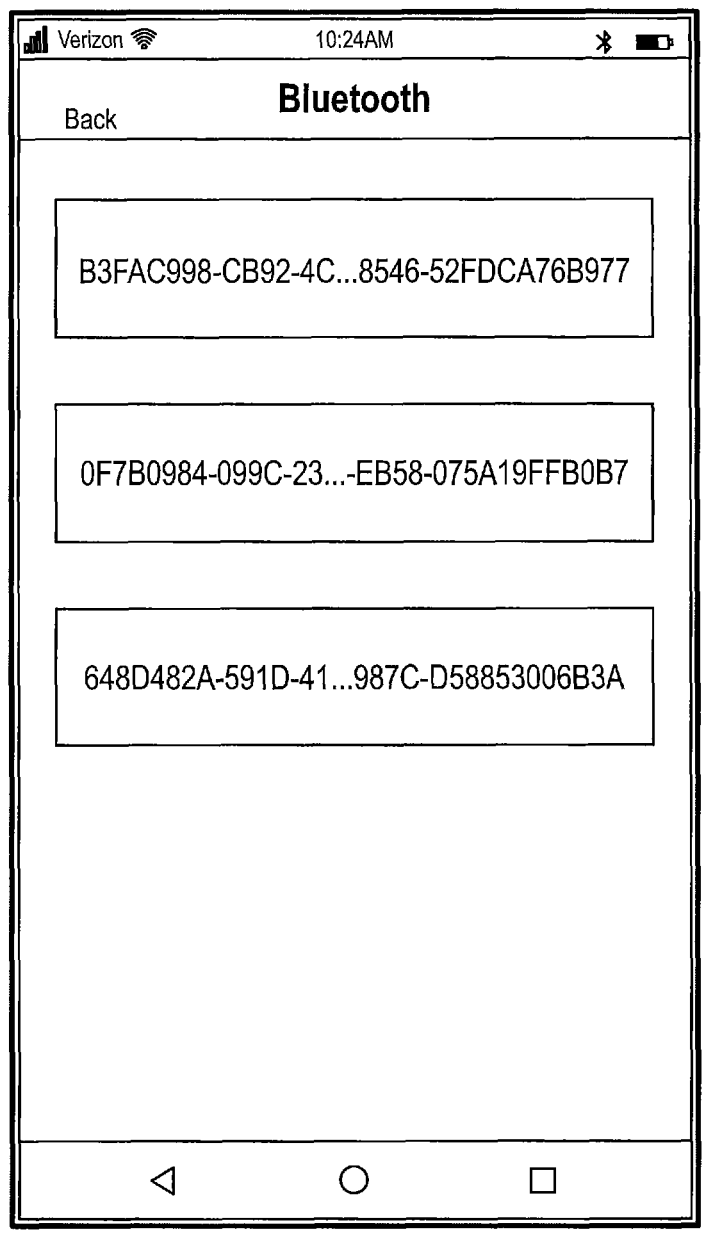
FIG. 52 illustrates an example of a user interface for access control and identification, according to one or more embodiments of the present disclosure.

As is illustrated in FIG. 50, the main interface of the mobile app may be a personal badge for the user. This main page may include options taking the user to the key and card libraries. The user may choose a personal image for their "main badge" on the homepage. Like the card and key libraries, there may be a badge library of saved badges to be pulled by the user. These badges include, but are not limited to work ID badges, government IDs, school IDs, driver's licenses, boarding passes, concert and venue tickets, etc.

Figure 53:
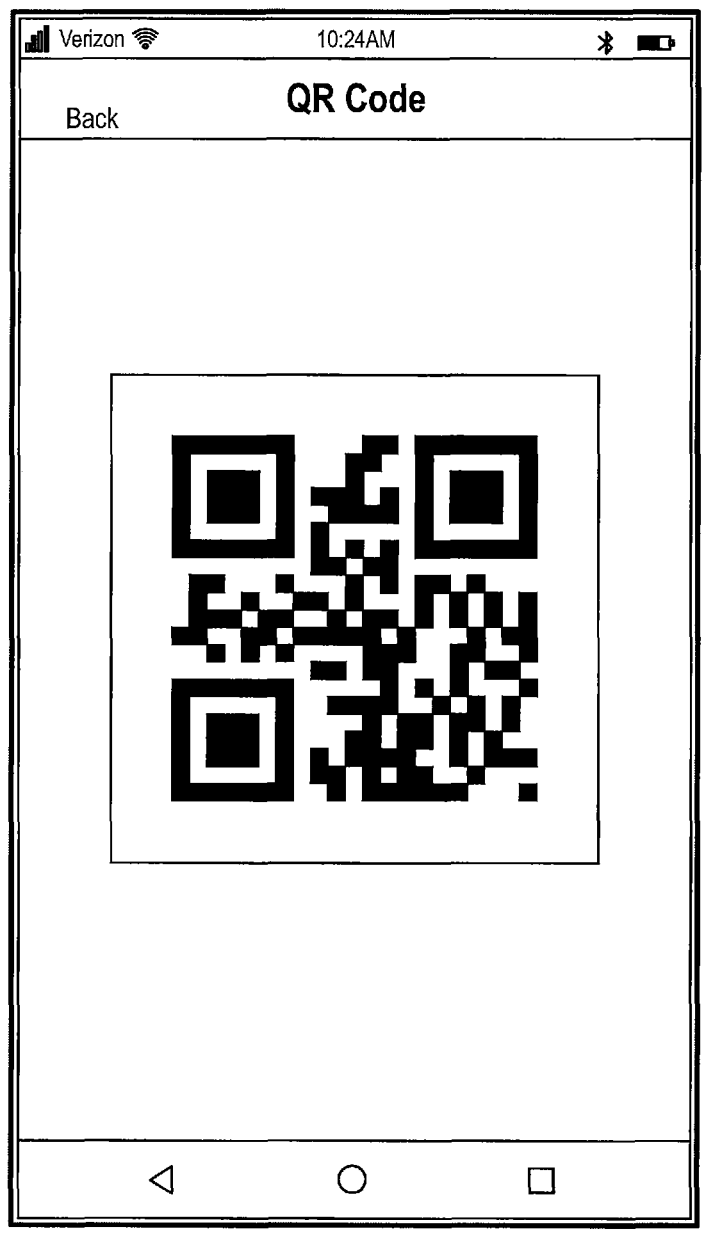
FIG. 53 illustrates an example of a user interface for access control and identification, according to one or more embodiments of the present disclosure.

ID badges may include unique barcodes or QR codes (see, e.g., FIG. 53) as would appear on a physical identification. These barcodes attached to one of a user's digital id badges may be read by an appropriate reader.

With further reference to FIG. 2, in some embodiments, the client device 210 also can include a location unit 214 that can permit or otherwise facilitate generating a location estimate of a current location of the client device 210. In one embodiment, the location unit 214 can be configured to receive timing messages from a global navigation system (e.g., global positioning system (GPS)), and to generate the location estimate using at least the timing messages.

The client device 210 also can include one or more processors 230 and one or more memory devices (collectively referred to as memory 240). The memory 240 can include one or more access and identification (A&I) component(s) 246 that can configure the processor(s) 230 to provide one or more functionalities described herein. The A&I component(s) can be executed by at least one of the processor(s) 230 and can cause the at least one processor, and the client device, to provide the one or more functionalities. More specifically, in response to execution of the A&I component(s) 246 by at least one of the processor(s) 230, for example, can cause the client device 210 to perform or facilitate operations that provide the one or more functionalities described herein.

The memory 240 also can include A&I information 246 that includes multiple access keys 248 and card information 250. In some embodiments, the multiple access keys 248 can embody or can constitute a library of access keys available to an end-user of the mobile device. In addition, in one of such embodiments, the card information 250 can include a user profile for the end-user. In other embodiments, card information 250 may be absent. As mentioned, in one example, at least a first one (or, in some embodiments, each one) of the access keys 248 can be embodied in or can include an identification badge associated with an end-user of the client device 210. In addition, at least a second one of the access keys 248 can be embodied in or can include an access code for use in attempting access (and, ultimately, being granted access or denied access) to a zone in accordance with this disclosure.

Figure 4:
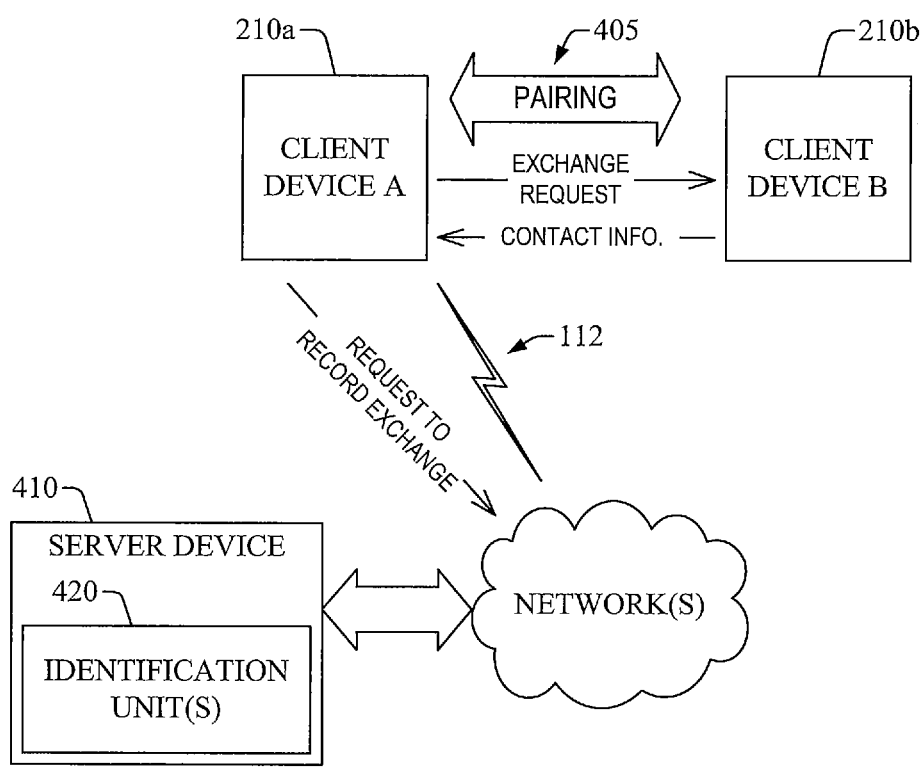
FIG. 4 presents an example of an operational environment for identification of user devices, according to one or more embodiments of the disclosure.

FIG. 4 presents an example of an operational environment 400 for identification of user devices, according to one or more embodiments of the disclosure. The operational environment 400 can include a client device A 210a and a client device 210b. Each one of such devices can include the functional elements described herein in connection with client device 210. As is illustrated, the client device A 210a can establish a connection with the client device B 210b. In one example, to establish such a connection, the client device A 210a can send a connection request message to connect with the client device B 210b, and in response, the client device A 210a can receive a response message (e.g., an ACK message) indicating that the connection is established. Establishment of such a connection is represented as pairing 405 in FIG. 4. In some instances, the client device A 210a can send the connection request message in response to receiving input information indicative of a selection to exchange contact information (e.g., business information or other type of identification (ID) information). The input information can be received via a GUI displayed at the client device 210a, for example. In other instances, the client device A 210a can be configured to broadcast an indication of availability to supply contact information. The indication can be broadcasted wirelessly, within pilot signals. Broadcasting such an indication can permit or otherwise facilitate reaching out to other client device(s), including the client device B 210b, that can be configured to "listen" (e.g., monitor wireless signals) for an opportunity to receive, send, or exchange contact information. Therefore, in one aspect, user devices can detect other user devices in proximity and available to exchange contact information regardless of a prior association between such user devices.

After or upon the connection has been established, the client device A 210a can send, to the client device B 210b, a request message to 410 to supply contact information. In response, the client device B 210b can send contact information 420. The client device A 210a can receive the contact information 420 and can retain at least a portion of the contact information 420 in a memory device 240 (not shown in FIG. 4) of the client device A 210a.

In addition or in some embodiments, upon or after receiving at least a portion of the contact information 420, the client device 210a can send a request message 430 to record an exchange of contact information 420. The request message 430 can include location information indicative or otherwise representative of a location of client device A 210a at the time of the exchange or at a time shortly (e.g., tens of milliseconds, hundreds of millisecond, a second, a few seconds) after the exchange. In addition or in some embodiments, the request message 430 also can include a timestamp (or other type of information) indicative of a date and a time at which the contact information 420 is received.

As is illustrated in FIG. 4, the request message 430 can be sent to a server device 440 that includes one or more identification units 450 in accordance with this disclosure. The identification unit(s) 450 can be the same as or similar to the identification unit(s) 122a. In one instance, the server device 440 can receive the request message 430 and, in response, can determine that a user profile associated with the client device B 210b is present in a user repository (e.g., user repository 150; not shown in FIG. 4). In response, in one aspect, the server device 440 can generate a record of the exchange (which can be referred to as a card exchange record) and can retain such a record in a card exchange repository (not shown in FIG. 4). In another instance, the service device 440 can determine that a user profile associated with the client device B 210b is not present or otherwise available in the user repository. In response, in one aspect, the server device 440 can generate a user profile using the at least a contact information of the contact information 420. The user profile can be associated with the client device B 210b. In addition or in the alternative, the server device 440 can generate a record of the exchange and can retain such a record in the card exchange repository.

The client device A 210a can operate on card information retained at a memory device of the client device A 210a and/or the card exchange repository.

As described herein, whenever zones are accessed—e.g., access denied or access granted—an indication of the access occurrence may be logged and saved in access record repository 152 or any other memory device accessible to a server device, e.g., server device 120a or server device 120b. Thus, an audit trail applicable to one or more zones can be created.

Figure 5:
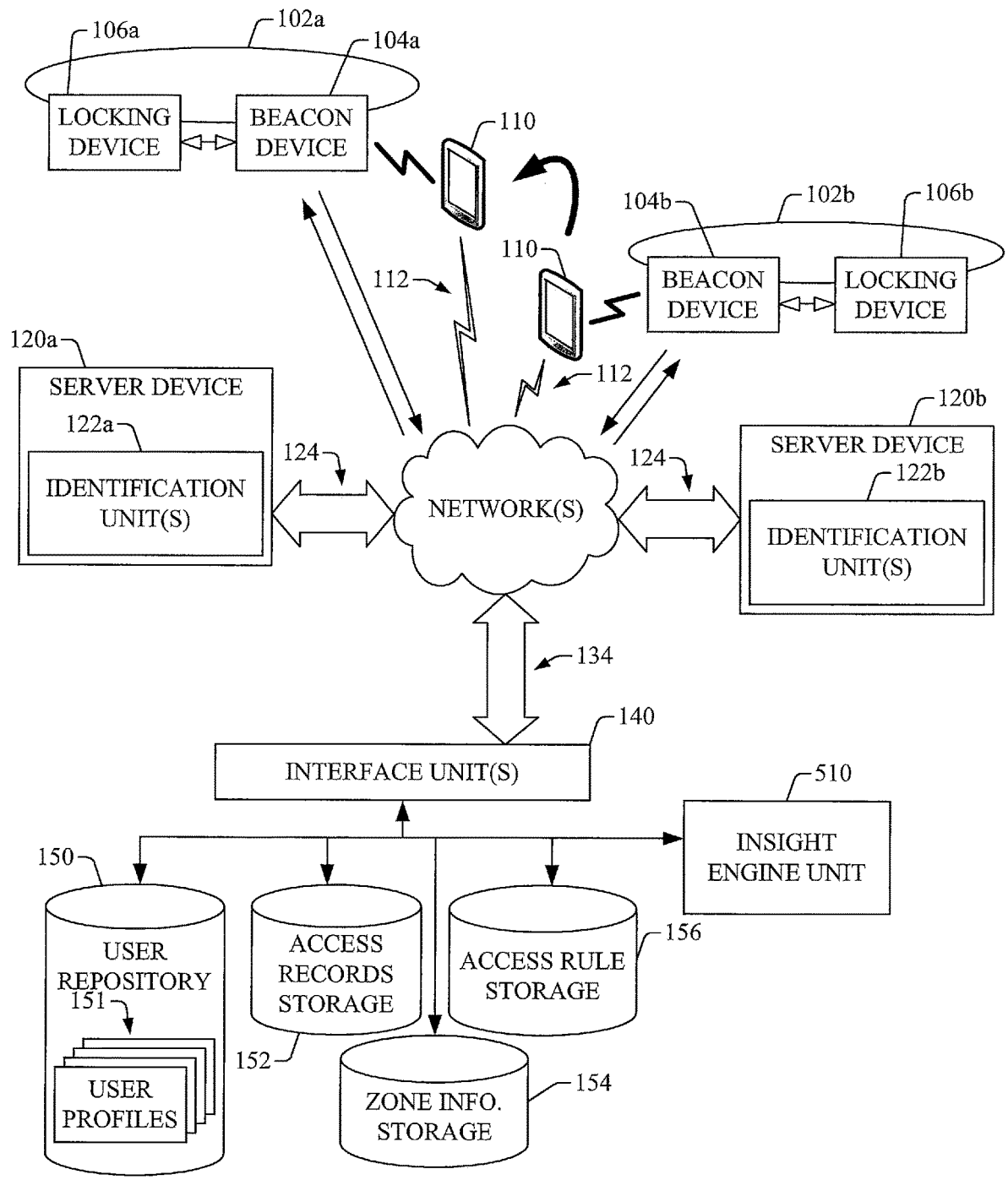
FIG. 5 presents an example of another operational environment for access control and identification of user devices, according to one or more embodiments of the disclosure.

In addition, records indicative of access granted and/or access denied for one or more zones and/or one or more user devices (e.g., mobile device(s)) can be utilized or otherwise leveraged to generate insights related to access behavior of a user device or a group of user devices. To that end, as is illustrated in FIG. 5, an operation environment 500 in accordance with this disclosure can include an insight engine unit 510 functionally coupled to user repository 150; access records storage 152; zone information storage 154; and/or access rule storage 156. As such, in one embodiment, the insight engine unit 510 can determine that a correlation is present between (a) first entry records (first access granted records, first access denied records, or a combination thereof) associated with a first zone and (b) second entry records associated with a zone. The first zone can include zone 102a and the second zone can include zone 102b. The insight engine unit 510 can send information indicative of the correlation to server device 120a and/or server device 120b. Based on at least one of the correlation, at least one of a portion of the first entry records, or a portion of the second entry records, the server device 120a and/or server device 120b can configure a second access rule associated with a user profile, the second access rule can regulate entry to a third zone. In addition, the server device(s) that configure the access rule can generate an access key indicative of a unique user identifier associated with the user profile. Such server device(s) can associate the access key with the third zone, and can send the second access key to the communication address of the mobile computing device.

In addition or in other embodiments, the insight engine 510 can perform or otherwise facilitate a data mining process that can include four groups of operations: (I) Data selection. Data is pulled into the engine from multiple sources. These sources can be log files, external data and even most likely a database. The selection process typically involves aggregating these different sources into a single source, normally a flat list of key value pairs. (II) Data preprocessing and transformation. The preprocessing operations can include normalizing the data from the selection process, running some basic validation rules and removing erroneous samples. Transformation is normally applied to the preprocessed data to prepare the sample set of data for processing in the next step. Different processing algorithms require different transformation. At times these transformations can be as simple as just ordering the data by a particular attribute. An example of a more complicated transformation might be running further calculations on the sample set producing derived attributes such as a sum of failed unlocked for a particular user or an average time a particular zone is accessed.

(III) Data analysis (or data mining). This group of operations can include the determination of patterns or other types of features presents in the pre-processed and transformed data. That end, the insight engine unit 510 can implement (e.g., perform) numerous algorithms against a preprocessed and transformed set of data. Such algorithms can include various feature detection algorithms. Each one of the algorithms can produce different results depending of a specific feature of interest, such as type of pattern. The algorithm can include clustering, classification like decision trees, and regression. In one embodiment, the insight engine can implement a decision tree, which is a type of classification. In such an embodiment, the insight engine unit 510 can apply a set of rules to available data, where the set of rules can be modeled after a defined set of patterns. The defined set of patterns can be determined based on an access behavior of interest. As part of the implementation of the decision tree, the insight engine unit 500 can train one or more of the rules in the defined set of rules against a training set of data. Such rule(s) can be adjusted based at least on available non-training data.

(IV) Generation of insight and/or interpolation. After or upon a pattern is determined or otherwise identified, the insight engine unit can further analyze data associated with the pattern. Such further analysis can permit adjusting a group of algorithms applied by the insight engine unit to extract feature(s) and, ultimately, determine an insight (e.g., an amount of actionable knowledge. Such adjustment can be implemented in learning stage of the data analysis. Once we have a set found patterns we can report them in various ways, storing them in a database for later review by the system. The system can also at this point perform some predefined automated actions. As discussed herein, push notifications or other types of notification can be sent to one or more specific devices, for example.

Figure 6:
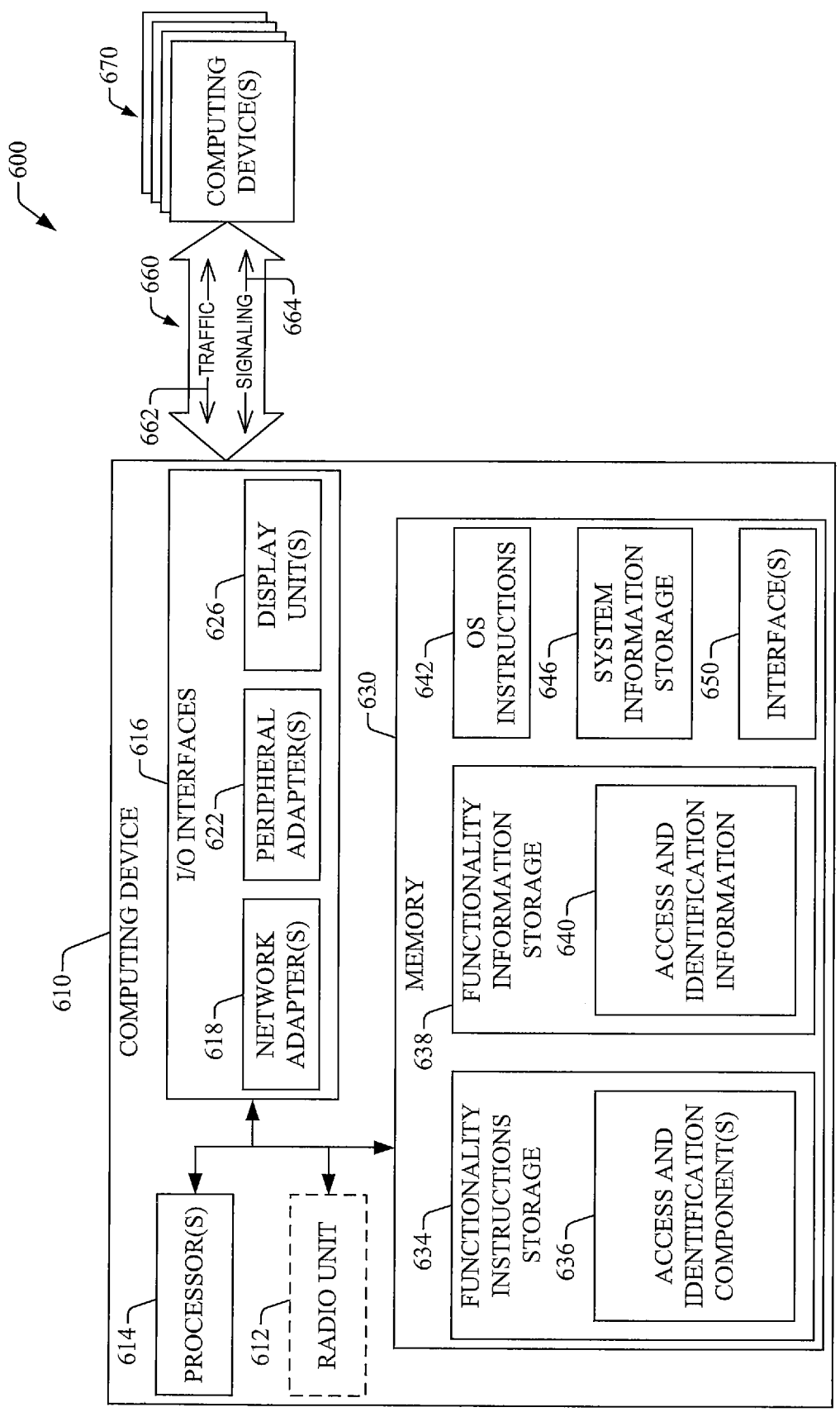
FIG. 6 presents an example of a computing environment for access control and identification in accordance with one or more embodiments of this disclosure.

FIG. 6 illustrates example of a computational environment 600 for access control and identification of a user device, in accordance with one or more embodiments of the disclosure. The example computational environment 2300 is merely illustrative and is not intended to suggest or otherwise convey any limitation as to the scope of use or functionality of the computational environment's architecture. In addition, the illustrative computational environment 2300 depicted in FIG. 6 should not be interpreted as having any dependency or requirement relating to any one or combination of components illustrated in the example operational environments of the disclosure. The example computational environment 2300 or portions thereof can embody or can constitute the operational environments described hereinbefore. As such, the computing device 2310 can embody or can constitute, for example, any of the communication devices or servers (such as the caller analysis server 140) described herein. In one example, the computing device 2310 can be embodied in a portable personal computer or a handheld computing device, such as a mobile tablet computer, an electronic-book reader, a mobile telephone (e.g., a smartphone), and the like. In another example, the computing device 2310 can be embodied in a wearable computing device, such as a watch, goggles or head-mounted visors, or the like. In yet another example, the computing device 2310 can be embodied in portable consumer electronics equipment, such as a camera, a portable television set, a gaming console, a navigation device, a voice-over-internet-protocol telephone, a media playback device, or the like.

The computational environment 2300 represents an example implementation of the various aspects or features of the disclosure in which the processing or execution of operations described in connection with the management of unknown callers in accordance with aspects disclosed herein can be performed in response to execution of one or more software components at the computing device 2310. It should be appreciated that the one or more software components can render the computing device 2310, or any other computing device that contains such components, a particular machine for the management of unknown callers in accordance with aspects described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods described herein, such as the example method presented in FIG. 6. For instance, to embody one such method, at least the portion of the computer-accessible instructions can be retained (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 2310 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 2310 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the management of unknown callers in accordance with aspects described herein can comprise personal computers; server computers; laptop devices; handheld computing devices, such as mobile tablets or e-readers; wearable computing devices; and multiprocessor systems. Additional examples can include set-top boxes, programmable consumer electronics, network personal computers (PCs), minicomputers, mainframe computers, blade computers, programmable logic controllers, distributed computing environments that comprise any of the above systems or devices, and the like.

As illustrated in FIG. 6, the computing device 610 can comprise one or more processors 614, one or more input/output (I/O) interfaces 616, a memory 630, and a bus architecture 632 (also termed bus 632) that functionally couples various functional elements of the computing device 610. In certain embodiments, the computing device 610 can include, optionally, a radio unit 612. The radio unit 612 can include one or more antennas and a communication processing unit that can permit wireless communication between the computing device 610 and another device, such as one of the computing device(s) 670. The bus 632 can include at least one of a system bus, a memory bus, an address bus, or a message bus, and can permit the exchange of information (data, metadata, and/or signaling) between the processor(s) 614, the I/O interface(s) 616, and/or the memory 630, or respective functional elements therein. In certain scenarios, the bus 632 in conjunction with one or more internal programming interfaces 650 (also referred to as interface(s) 650) can permit such exchange of information. In scenarios in which the processor(s) 614 include multiple processors, the computing device 610 can utilize parallel computing.

The I/O interface(s) 616 can permit communication of information between the computing device and an external device, such as another computing device, e.g., a network element or an end-user device. Such communication can include direct communication or indirect communication, such as the exchange of information between the computing device 610 and the external device via a network or elements thereof. As illustrated, the I/O interface(s) 616 can comprise one or more of network adapter(s) 618, peripheral adapter(s) 622, and display unit(s) 626. Such adapter(s) can permit or facilitate connectivity between the external device and one or more of the processor(s) 614 or the memory 630. For example, the peripheral adapter(s) 622 can include a group of ports, which can include at least one of parallel ports, serial ports, Ethernet ports, V.35 ports, or X.21 ports. In certain embodiments, the parallel ports can comprise General Purpose Interface Bus (GPM), IEEE-1284, while the serial ports can include Recommended Standard (RS)-232, V.11, Universal Serial Bus (USB), FireWire or IEEE-1394.

In one aspect, at least one of the network adapter(s) 618 can functionally couple the computing device 610 to one or more computing devices 670 via one or more traffic and signaling pipes 660 that can permit or facilitate the exchange of traffic 662 and signaling 664 between the computing device 610 and the one or more computing devices 670. Such network coupling provided at least in part by the at least one of the network adapter(s) 618 can be implemented in a wired environment, a wireless environment, or both. The information that is communicated by the at least one of the network adapter(s) 618 can result from the implementation of one or more operations of a method in accordance with aspects of this disclosure. Such output can be any form of visual representation, including, but not limited to, textual, graphical, animation, audio, tactile, and the like. In certain scenarios, each of the computing device(s) 670 can have substantially the same architecture as the computing device 610. In addition or in the alternative, the display unit(s) 626 can include functional elements (e.g., lights, such as light-emitting diodes; a display, such as a liquid crystal display (LCD), a plasma monitor, a light-emitting diode (LED) monitor, or an electrochromic monitor; combinations thereof; or the like) that can permit control of the operation of the computing device 610, or can permit conveying or revealing the operational conditions of the computing device 610.

In one aspect, the bus 632 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and the like. The bus 632, and all buses described herein can be implemented over a wired or wireless network connection and each of the subsystems, including the processor(s) 614, the memory 630 and memory elements therein, and the I/O interface(s) 616 can be contained within one or more remote computing devices 670 at physically separate locations, connected through buses of this form, in effect implementing a fully distributed system. In certain embodiments, such a distributed system can implement the functionality described herein in a client-host or client-server configuration in which the access and identification component(s) 636 or the access and identification information 640, or both, can be distributed between the computing device 610 and at least one of the computing device(s) 670, and the computing device 610 and at least one of the computing device(s) 670 can execute such components and/or leverage such information. It should be appreciated that, in an embodiment in which the computing device 610 embodies or constitutes a client device (e.g., client device 210), the access and identification component(s) 636 can be different from those in an embodiment in which the computing device 610 embodies or constitutes a server device (e.g., server device 160, server device 120a, or server device 120b) or an interface unit 140 in accordance with aspects of this disclosure.

The computing device 610 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 610, and can comprise, for example, both volatile and non-volatile media, and removable and/or non-removable media.

In one aspect, the memory 630 can comprise computer-readable media in the form of volatile memory, such as random access memory (RAM), and/or non-volatile memory, such as read-only memory (ROM).

The memory 630 can comprise functionality instructions storage 634 and functionality information storage 638. The functionality instructions storage 634 can comprise computer-accessible instructions that, in response to execution (by at least one of the processor(s) 614), can implement one or more of the functionalities of the disclosure. The computer-accessible instructions can embody or can comprise one or more software components illustrated as access and identification component(s) 636. In one scenario, execution of at least one component of the access and identification component(s) 636 can implement one or more of the methods described herein, such as the example methods 700, 750, 800, 900, 1000, 1100, 1200, and 1300. For instance, such execution can cause a processor (e.g., one of the processor(s) 614) that executes the at least one component to carry out a disclosed example method. It should be appreciated that, in one aspect, a processor of the processor(s) 614 that executes at least one of the access and identification component(s) 636 can retrieve information from or retain information in one or more memory elements 640 in the functionality information storage 638 in order to operate in accordance with the functionality programmed or otherwise configured by the access and identification component(s) 636. The one or more memory elements 640 may embody at least some of the repositories coupled to the interface unit 140. Such elements may be referred to as access and identification information and can include at least one of code instructions, information structures, or the like. For instance, at least a portion of such information structures can be indicative or otherwise representative of elements retained in the repositories functionally coupled to the interface 140, in accordance with aspects described herein.

At least one of the one or more interfaces 650 (e.g., application programming interface(s)) can permit or facilitate communication of information between two or more components within the functionality instructions storage 634. The information that is communicated by the at least one interface can result from implementation of one or more operations in a method of the disclosure. In certain embodiments, one or more of the functionality instructions storage 634 and the functionality information storage 638 can be embodied in or can comprise removable/non-removable, and/or volatile/non-volatile computer storage media.

At least a portion of at least one of the access and identification component(s) 636 or the access and identification information 640 can program or otherwise configure one or more of the processors 614 to operate at least in accordance with the functionality described herein. One or more of the processor(s) 614 can execute at least one of the access and identification component(s) 636 and leverage at least a portion of the information in the functionality information storage 638 in order to provide access control and identification of user devices in accordance with one or more aspects described herein.

It should be appreciated that, in certain scenarios, the functionality instructions storage 634 can embody or can comprise a computer-readable non-transitory storage medium having computer-accessible instructions that, in response to execution, cause at least one processor (e.g., one or more of the processor(s) 614) to perform a group of operations comprising the operations or blocks described in connection with the disclosed methods.

In addition, the memory 630 can comprise computer-accessible instructions and information (e.g., data, metadata, and/or programming code instructions) that permit or facilitate the operation and/or administration (e.g., upgrades, software installation, any other configuration, or the like) of the computing device 610. Accordingly, as illustrated, the memory 630 can comprise a memory element 642 (labeled operating system (OS) instruction(s) 642) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 610 can dictate a suitable OS. The memory 630 also comprises a system information storage 646 having data, metadata, and/or programming code that permits or facilitates the operation and/or administration of the computing device 610. Elements of the OS instruction(s) 642 and the system information storage 646 can be accessible or can be operated on by at least one of the processor(s) 614.

It should be recognized that while the functionality instructions storage 634 and other executable program components, such as the OS instruction(s) 642, are illustrated herein as discrete blocks, such software components can reside at various times in different memory components of the computing device 610, and can be executed by at least one of the processor(s) 614. In certain scenarios, an implementation of the access and identification component(s) 636 can be retained on or transmitted across some form of computer-readable media.

The computing device 610 and/or one of the computing device(s) 670 can include a power supply (not shown), which can power up components or functional elements within such devices. The power supply can be a rechargeable power supply, e.g., a rechargeable battery, and it can include one or more transformers to achieve a power level suitable for the operation of the computing device 610 and/or one of the computing device(s) 670, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 618) to connect operationally to the conventional power grid. In another aspect, the power supply can include an energy conversion component, such as a solar panel, to provide additional or alternative power resources or autonomy for the computing device 610 and/or one of the computing device(s) 670.

The computing device 610 can operate in a networked environment by utilizing connections to one or more remote computing devices 670. As an illustration, a remote computing device can be a personal computer, a portable computer, a server, a router, a network computer, a peer device or other common network node, and so on. As described herein, connections (physical and/or logical) between the computing device 610 and a computing device of the one or more remote computing devices 670 can be made via one or more traffic and signaling pipes 660, which can comprise wired link(s) and/or wireless link(s) and several network elements (such as routers or switches, concentrators, servers, and the like) that form a LAN, a MAN, a WAN, and/or other networks (wireless or wired) having different footprints. Such networking environments are conventional and commonplace in dwellings, offices, enterprise-wide computer networks, intranets, local area networks, and wide area networks.

In some embodiments, access keys may be received by barcode/QR code scanners, Bluetooth readers, chip readers, radio signal readers, among other electronic receiving and processing devices. The reader devices (also referred to as beacon devices)—whichever type they may be (or location of installment) may be functionally coupled (e.g., wirelessly coupled) to a client device.

The functionality of client devices (e.g., user device 110, client device 210) and server devices (e.g., server device 120a or server device 120b) can be leveraged or utilized in multiple scenarios. In some embodiments, as is illustrated in FIGS. 40-47, such functionality can be utilized or otherwise leveraged in a housing unit for a receiver device controlled in accordance with aspects of this disclosure, e.g., the functionality of server devices of this disclosure. The housing unit may be configured to interact with the mobile app. In an embodiment, the housing unit may interact with the mobile app via at least one barcode scanner in the unit connected to a computing device such that the at least one barcode scanner or scanner responds to a signal from the mobile app to for e.g., unlock a door of a house. In some embodiments, multiple housing units may be secured to different areas in a house.

In view of the aspects described herein, various techniques for access control and/or identification of user devices (e.g., mobile computing devices) can be implemented in accordance with the disclosure. An example of such techniques can be better appreciated with reference to the diagrams (flowcharts and callflows) in FIGS. 7A-13. For purposes of simplicity of explanation, the examples of the method disclosed herein, with reference to such drawings, are presented and described as a series of blocks (with each block representing an action or an operation in a method, for example). However, it is to be understood and appreciated that such an example method or any other technique is not limited by the order of blocks and associated actions or operations, as some blocks may occur in different orders and/or concurrently with other blocks from those that are shown and described herein. For example, the methods (or processes or techniques) in accordance with this disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It should be appreciated that the techniques of the disclosure can be retained on an article of manufacture, or computer-readable medium, to permit or facilitate transporting and transferring such methods to a computing device (e.g., a desktop computer; a mobile computer, such as a tablet, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed techniques, can be employed to execute code instructions retained in a memory, or any computer- or machine-readable medium, to implement the one or more methods. The code instructions can provide a computer-executable or machine-executable framework to implement the techniques described herein.

Figure 7A:
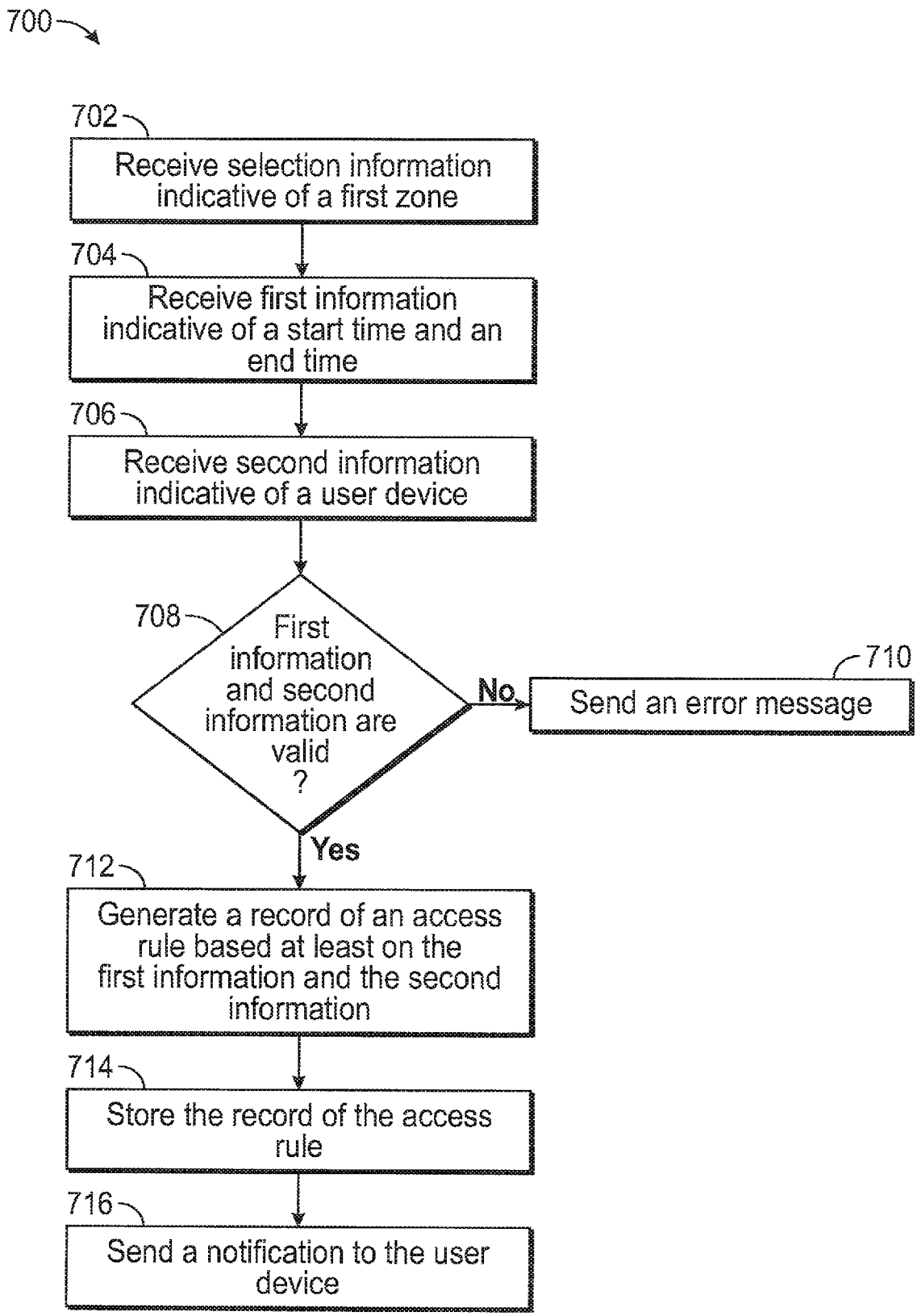
FIG. 7A presents an example of a method for generating an access rule in accordance with one or more embodiments of the present disclosure.

FIGS. 7A-24-25 illustrate examples of methods for access control and/or identification of user devices, responses in accordance with one or more embodiments of the disclosure. More specifically, FIG. 7A presents an example of a method 700 for generating an access rule in accordance with one or more embodiments of the present disclosure. The example method 700 can be implemented by one or more computing devices. At block 702, the one or more computing devices can receive selection information indicative of a first zone. At block 704, the one or more computing devices can receive first information of a start time and an end time. At block 706, the one or more computing devices can receive second information indicative of a user device. At block 708, the one or more computing devices can determine if the first information and the second information are valid. In response to a negative determination ("No" branch), the one or more computing devices can send an error message at block 710. In the alternative, in response to a positive determination ("Yes" branch), the one or more computing devices can generate a record of an access rule based at least on the first information and the second information at block 712. At block 714, the one or more computing devices can store the record of the access rule. At block 716, the one or more computing devices can send a notification to the user device in accordance with aspects of this disclosure.

Figure 7B:
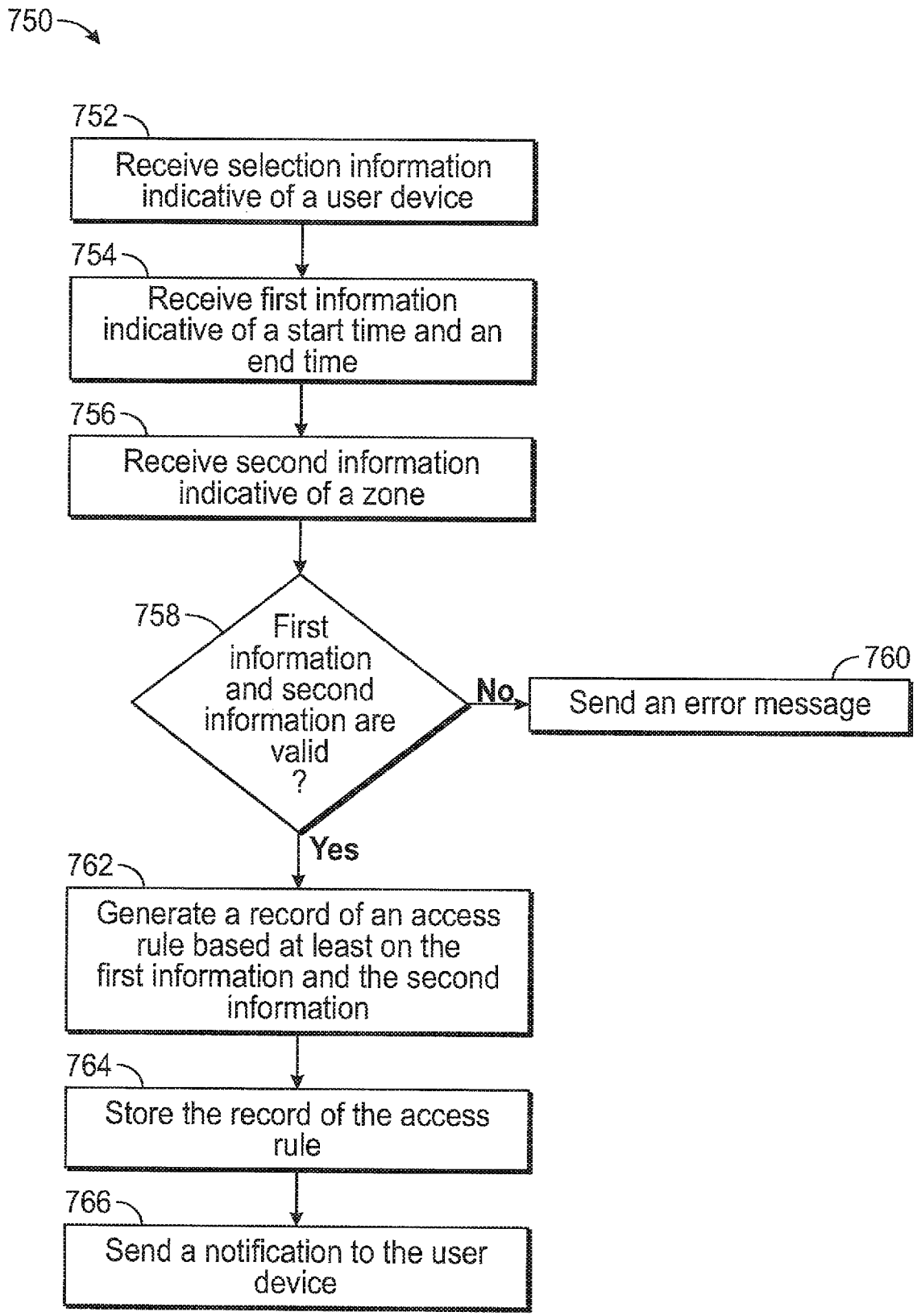
FIG. 7B presents an example of a method for generating an access rule, according to one or more embodiments of the present disclosure.

FIG. 7B presents an example of a method 750 for generating an access rule, according to one or more embodiments of the present disclosure. The example method 750 can be implemented by one or more computing devices. At block 752, the one or more computing devices can receive selection information indicative of a user device. At block 754, the one or more computing devices can receive first information indicative of a start time and an end time. At block 756, the one or more computing devices can receive second information indicative of a zone. At block 758, the one or more computing devices can determine if the first information and the second information are valid. In response to a negative determination ("No" branch), the one or more computing devices can send an error message at block 760. In the alternative, in response to a positive determination ("Yes" branch), the one or more computing devices can generate a record of an access rule based at least on the first information and the second information at block 762. At block 764, the one or more computing devices can store the record of the access rule. At block 766, the one or more computing devices can send a notification to the user device in accordance with aspects of this disclosure.

Figure 8:
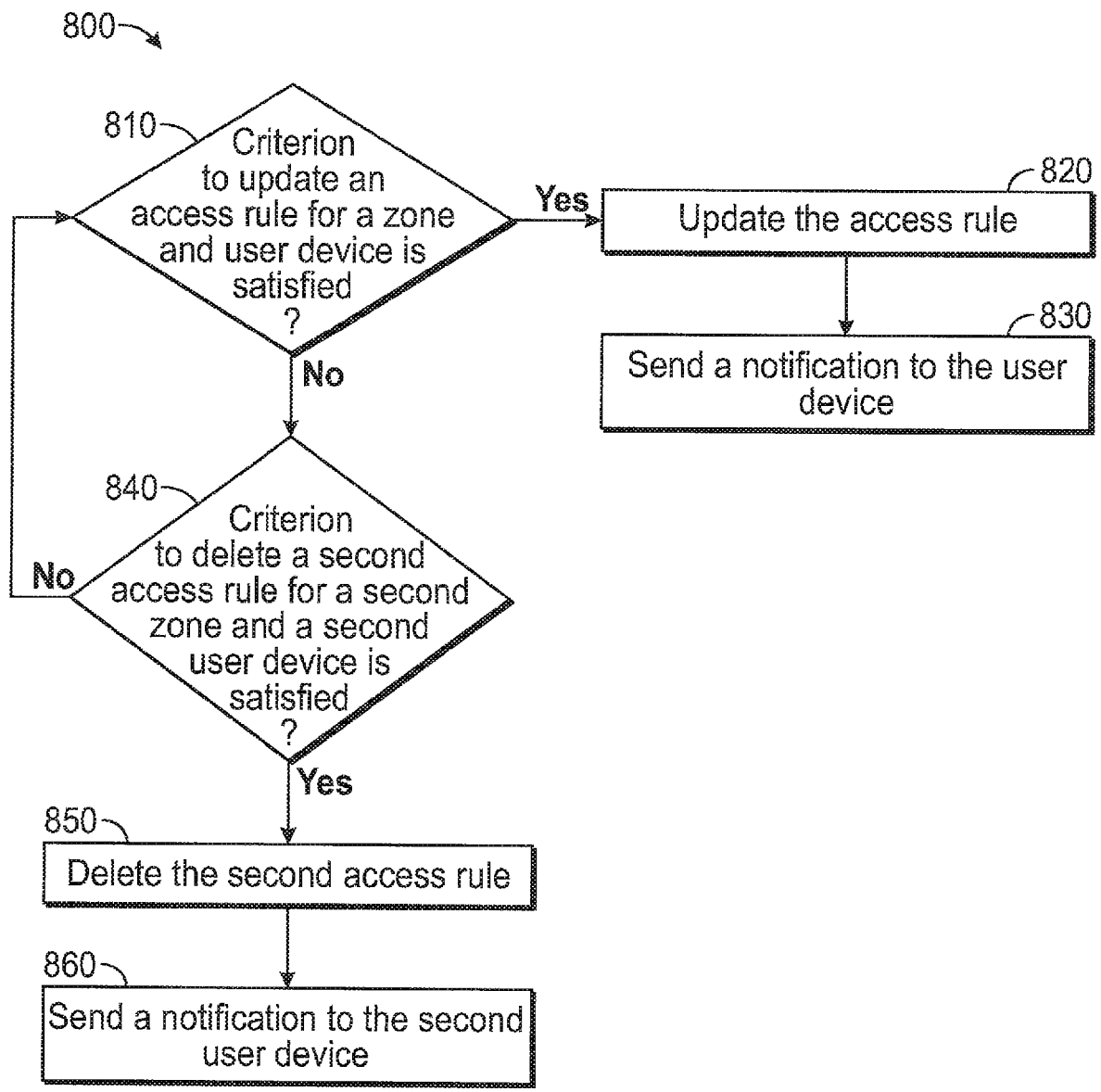
FIG. 8 presents an example of a method for changing access rules, according to one or more embodiments of the present disclosure.

FIG. 8 presents an example of a method 800 for changing access rules, according to one or more embodiments of the present disclosure. The example method 800 can be implemented by one or more computing devices. At block 810, the one or more devices can determine if a criterion to update an access rule for a zone and user device is satisfied. In response to an affirmative determination ("Yes" branch), the one or more computing devices can update the access rule at block 820. At block 830, the one or more computing devices can send a notification to the user device. In response to a negative determination, the one or more computing devices can determine if a criterion to delete a second access rule for a second zone and a second user device is satisfied. In response to a negative determination (e.g., "No" branch), the flow can return to block 810. In response to an affirmative determination ("Yes" branch), the one or more computing devices can delete the second access rule at block 850. At block 860, the one or more computing devices can send a notification to the second user device.

Figure 9:
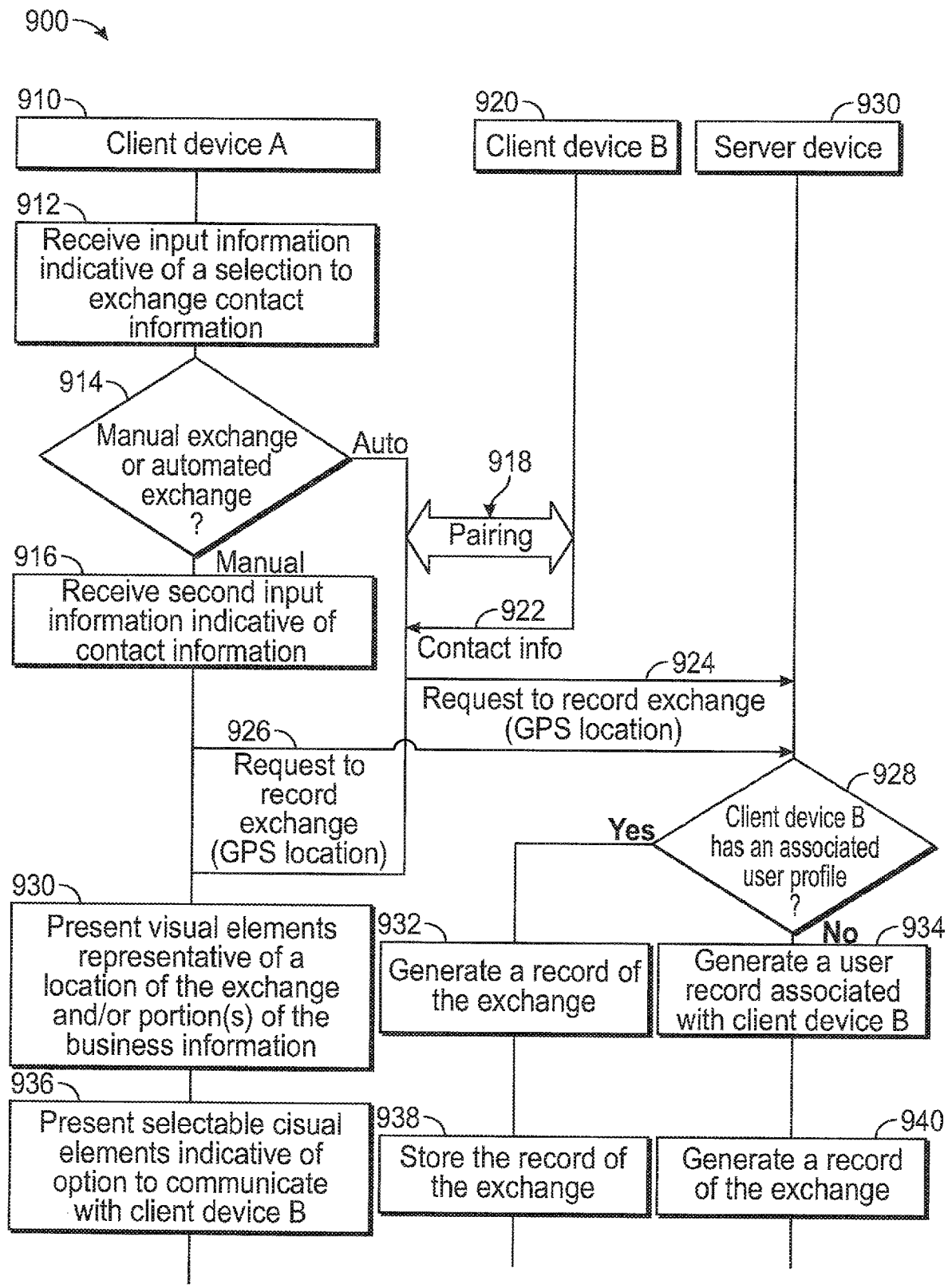
FIG. 9 presents an example of a method for exchanging contact information, according to one or more embodiments of the present disclosure.

FIG. 9 presents an example of a method 900 for activating a client device for access control and identification, according to one or more embodiments of the present disclosure.

At block 912, a client device A 910 can receive input information indicative of a selection to exchange contact information (e.g., a business card) with another client device (e.g., user device 110). At block 914, the client device 910 can determine if the exchange is a manual exchange or an automated exchange. In response to the exchange being manual ("Manual" branch), the client device A 910 can receive second input information indicative of contact information. At 926, the client device A 910 can send a request to record the exchange of information. The request can include location information, such as a GPS location estimate, representative of the location of the device at the time or nearly at the time the information is exchanged. In the alternative, in response to an automated exchange ("Auto" branch), the client device 910 and a client device B 920 can establish a connection by pairing or otherwise attaching to each other.

After or upon the connection is established, at 922, the client device B 920 can send contact information. In response to the contact information (e.g., name(s), address, place of business, etc.), the server device 930 can determine, at block 928, if the client device B 920 has an associated user profile (e.g., one of the user profiles retained in user repository 150. In response to a positive determination ("Yes" branch), at block 932, the server device 930 can generate a record of the exchange of the contact information. At block 938, the server device 930 can store the record of the exchange of the contact information. In response to a negative determination ("No" branch) the server device 930 can generate a user record associated with the client device B. At block 940, the server device 930 can generate a record of the exchange.

Figure 10:
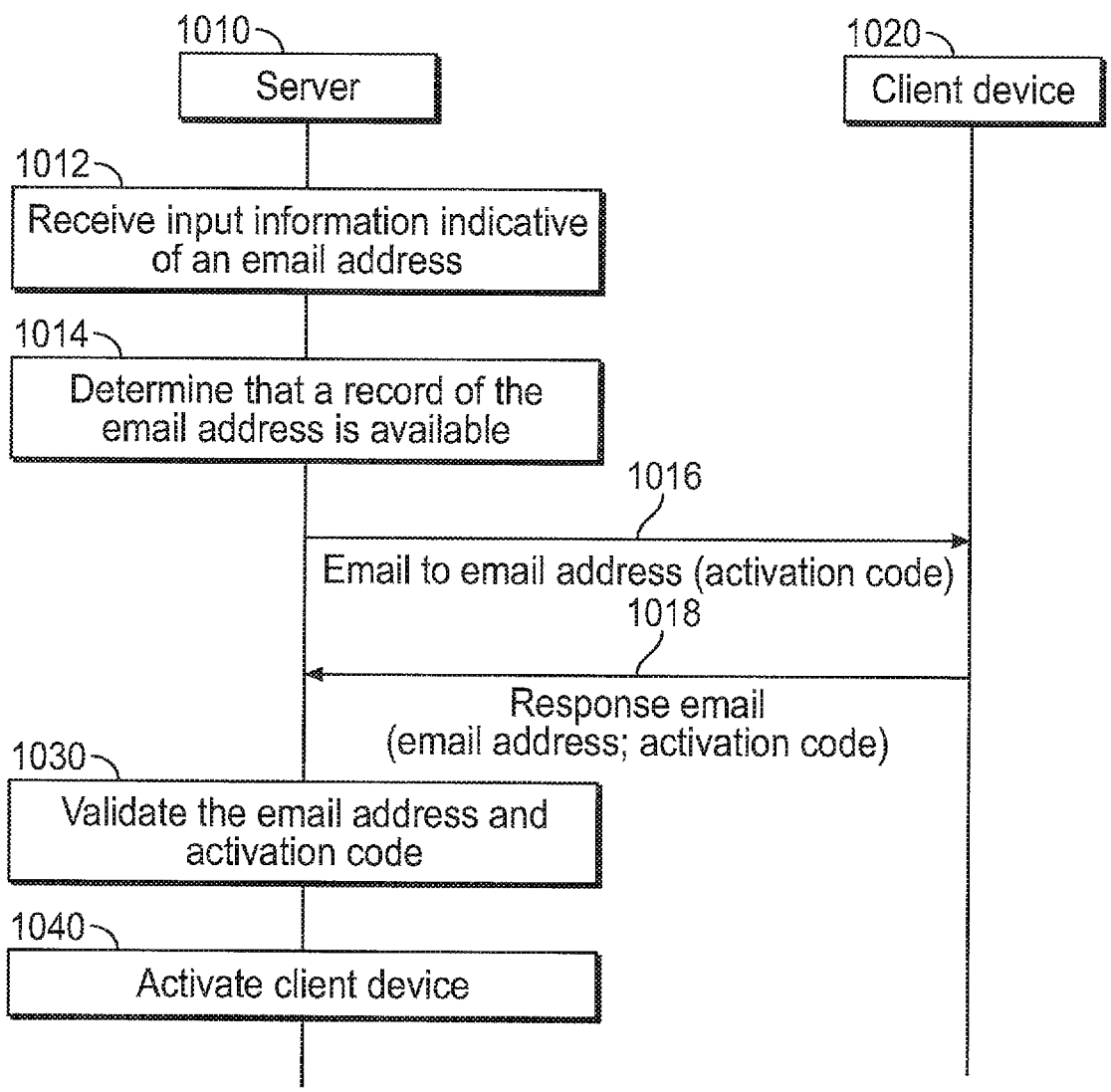
FIG. 10 presents an example of a method for activating a client device for access control and identification, according to one or more embodiments of the present disclosure.

FIG. 10 presents an example of a method 1000 for exchanging contact information, according to one or more embodiments of the present disclosure. As is illustrated, at block 1012, a server device 1012 can receive input information indicative of an email address. At block 1014, the server device 1010 can determine that a record of the email address is available. For instance, the server device can determine that the email address is available in a user profile retained in user repository 150. At 1016, the server device can send an email to the email address. The email can include an activation code (e.g., a numeric code or an alphanumeric code). A client device 1020 can receive the email and, at 1018, the client device 1020 can send a response email to the server device 1010. The response email can include the email address and the activation code. At block 1030, the server device 1010 can validate the email address and the activation code. At block 1040, the server device can activate the client device 1020.

Figure 11:
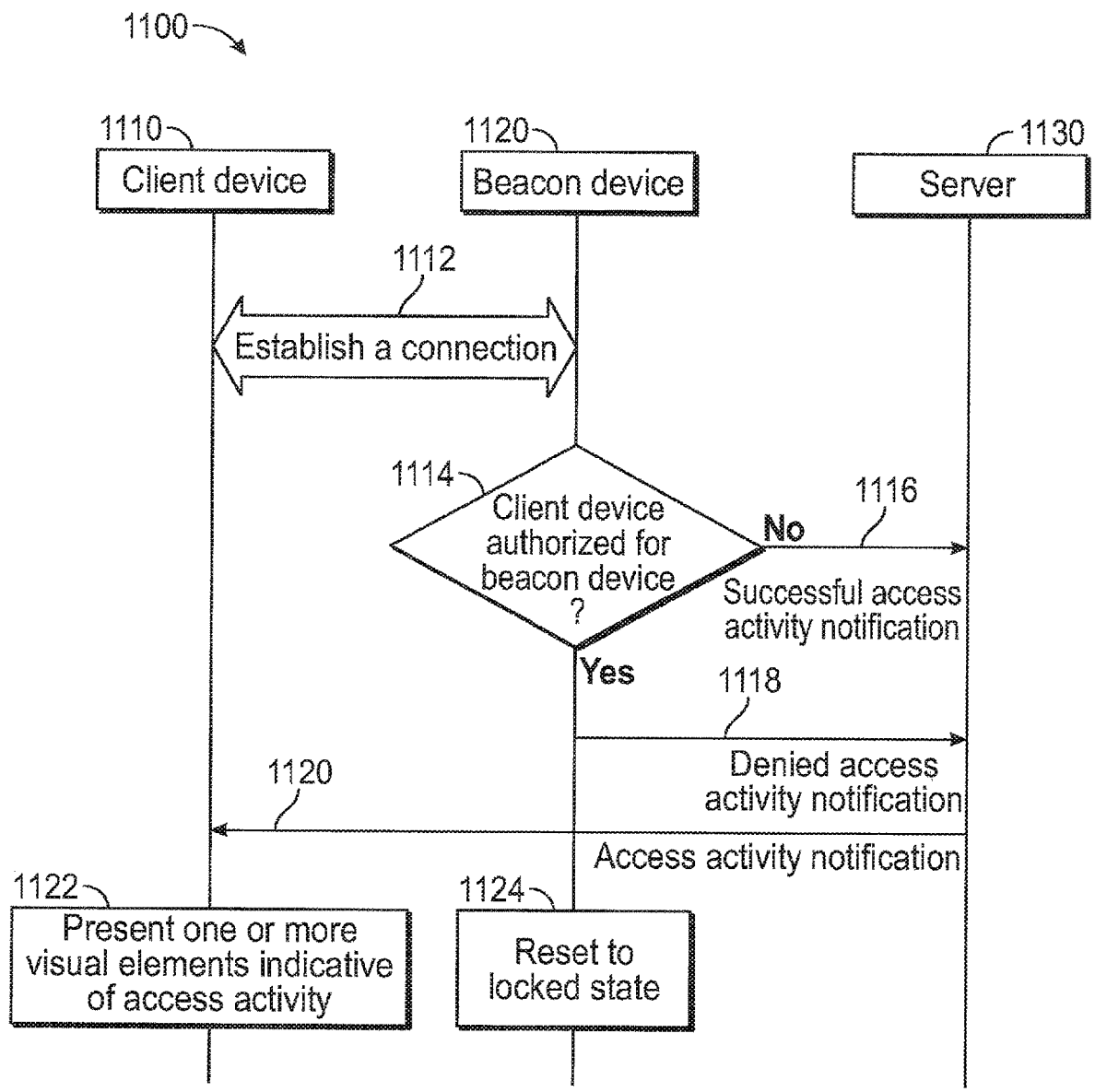
FIG. 11 presents an example of a method for interaction between a client device and a beacon device, according to one or more embodiments of the present disclosure.

FIG. 11 presents an example of a method 1100 for interaction between a client device 1110 and a beacon device 1120, according to one or more embodiments of the present disclosure. At block 1112, the client device 1110 and the beacon device 1120 (e.g., beacon device 104a or beacon device 104b) can establish a connection for wireless communication between such devices. At block 1114, the beacon device 1120 can determine if the client device is authorized for beacon device 1120. In response to a negative determination, at 1116, the beacon device 1120 can send, to the server device 1130, a notification or another type of indication of successful access activity. In response to a positive determination, at 1118, the beacon device 1120 can send, to the server device 1130, a notification or another type of indication of denied access activity. At 1120, the server device 1130 can send an access notification or another type of indication to the client device 1110. At block 1122, the client device 1110 can present one or more visual elements indicative of access activity.

Figure 12:
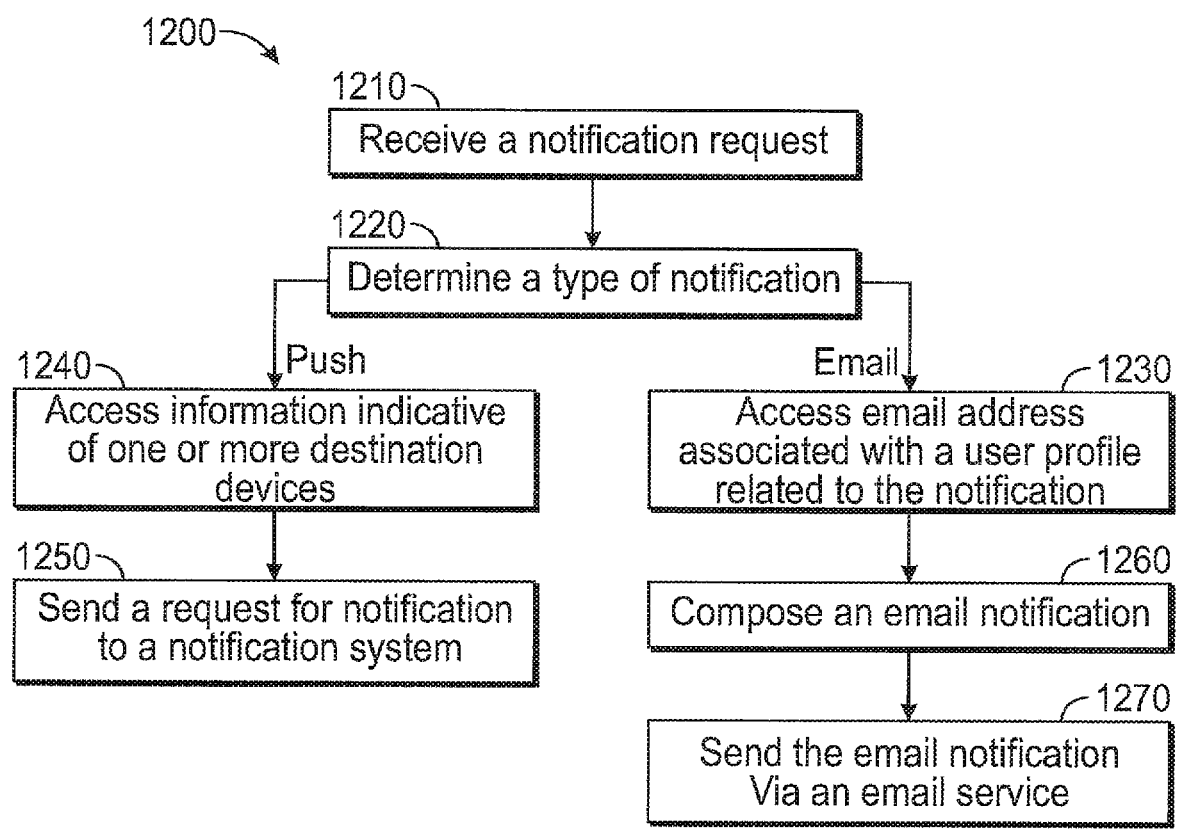
FIG. 12 presents an example of a method for notifying a client device, according to one or more embodiments of the present disclosure.

FIG. 12 presents an example of a method 1200 for notifying a client device, according to one or more embodiments of the present disclosure. One or more computing devices can implement (e.g., execute) at least a portion of the method 1200. At block 1210, the one or more computing devices can receive a notification request. At block 1220, the one or more computing devices, the one or more computing devices can determine a type notification, e.g., an email notification or a push notification. For a push notification ("Push" branch), the one or more computing devices can determine access information indication of one or more destination devices. At block 1250, the one or more computing devices can send a request for notification to a notification system. For an email notification ("Email" branch), the one or more computing devices can access an email address associated with a user profile related to the notification. At block 1260, the one or more computing devices can compose or otherwise generate an email notification. At block 1270, the one or more computing devices can send the email notification via an email service.

Figure 13:
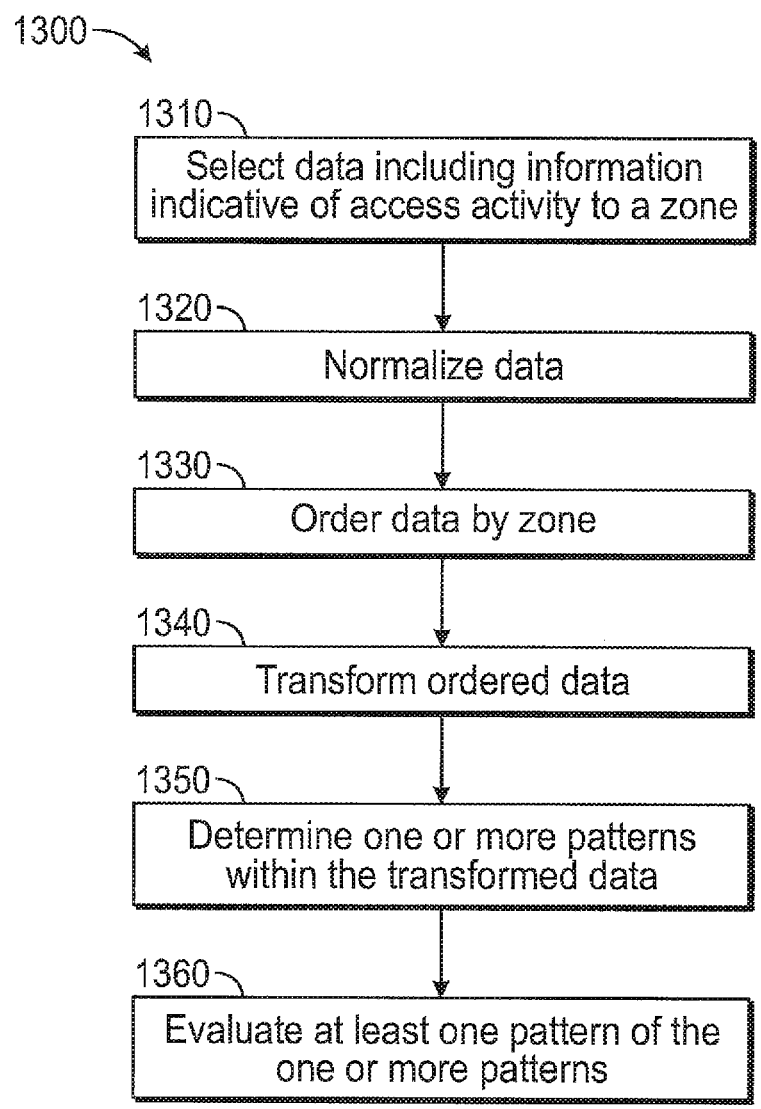
FIG. 13 presents an example of a method for determining features from data associated with access control and identification, according to one or more embodiments of the present disclosure.

FIG. 13 presents an example of a method 1300 for determining features from data associated with access control and identification, according to one or more embodiments of the present disclosure. The example method 1300 can be implemented by one or more computing devices. In one example, such devices can embody or can constitute the insight engine unit 510. At block 1310, the one or more computing device can select data including information indicative of access activity to a zone. At block 1320, the one or more computing devices can normalize the data. At block 1330, the one or more computing devices can order data by zone (e.g., zone 102a or zone 102b). At block 1340, the one or more computing devices can transform the ordered data. At block 1350, the one or more computing devices can determine one or more patterns within the transformed data. At block 1360, the one or more computing device can evaluate at least one of the one or more patterns.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit the performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor (s) functionally coupled thereto. Non-transitory storage media can include read-only memory (ROM); random access memory (RAM); magnetic disk storage media; optical storage media; flash memory, etc.

Embodiments of the operational environments and methods (or techniques) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or a method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "module," "pipe," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, and the electronic components can include a processor therein to execute software or firmware that provides, at least in part, the functionality of the electronic components. In certain embodiments, components can communicate via local and/or remote processes in accordance, for example, with a signal (either analog or digital) having one or more data packets (e.g., data from one component interacting with another component in a local system, distributed system, and/or across a network such as a wide area network with other systems via the signal). In other embodiments, components can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components. The terms "component," "environment," "system," "architecture," "interface," "unit," "module," and "pipe" can be utilized interchangeably and can be referred to collectively as functional elements.

As utilized in this disclosure, the term "processor" can refer to any computing processing unit or device comprising single-core processors; single processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance the performance of user equipment or other electronic equipment.

In addition, in the present specification and annexed drawings, terms such as "store," "storage," "data store," "data storage," "memory," "repository," and substantially any other information storage component relevant to the operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that can provide access control and/or identification of user devices. It is, of course, not possible to describe every conceivable combination of elements and/or methods for purposes of describing the various features of the disclosure, but it can be recognized that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A computing system, comprising:
    at least one memory device having instructions encoded thereon; and
    at least one processor coupled to the at least one memory device and configured, by the instructions, at least to:
        configure a zone associated with a point-of-entry device;
        generate a user record including a communication address and first user information;
        configure an access rule using at least the user record, the access rule regulates entry to the zone;
        send an activation code to the communication address;
        receive second user information generated at a mobile computing device in response to the activation code, the second user information including a communication address of the mobile computing device;
        generate a user profile using at least one of the user record or the second user information, the user profile includes the communication address of the mobile computing device;
        associate the access rule with the user profile;
        generate an access key indicative of a unique user identifier associated with the user profile;
        associate the access key with the zone;
        send the access key to the communication address of the mobile computing device;
        track and monitor access attempts by user devices; and
        determine when a criterion to update or delete an access rule has been met, and updating or deleting the access rule when the criterion is met.

2. The computing system of claim 1, wherein to configure the access rule, the at least one processor is further configured to generate a schedule for authorized entry to the zone, the schedule being one of a daily schedule having a recurring group of authorized periods over a 24 hour interval; a weekly schedule having a second recurring group of authorized periods over seven days; a monthly schedule having a third recurring group of authorized periods over a month; a defined non-recurring authorized period.

3. The computing system of claim 1, wherein to configure the access rule, the at least one processor is further configured to receive input information indicative of a schedule for authorized entry to the zone;
    to generate the access rule using the input information;
    to validate the access rule; and
    to store the access rule in a first memory device of the at least one memory device.

4. The computing system of claim 1, wherein the access key comprises one of a linear barcode or a matrix barcode.

5. The computing system of claim 1, wherein the at least one processor is further configured to determine that a first rule is satisfied, and to update the access rule.

6. The computing system of claim 5, wherein the at least one processor is further configured to determine that a second rule is satisfied, and to delete the access rule.

7. The computing system of claim 1, wherein the at least one processor is further configured to determine that a correlation is present between first entry records associated with the zone and second entry records associated with a second zone;
    to configure a second access rule associated that regulates entry to a third zone using at least one of a portion of the first entry records or a portion of the second entry records;
to generate a second access key indicative of the unique user identifier associated with the user profile;
    to associate the second access key with the third zone; and
    to send the second access key to the communication address of the mobile computing device.

8. The computing system of claim 1, wherein the at least one processor is further configured to provide a notification that the access rule is configured.

9. The computing system of claim 8, wherein the notification comprises a push notification, and wherein to provide the notification, the at least one processor is further configured to determine one or more communication addresses of respective one or more mobile computing devices associated with the user profile, and
    send a notification request to a messaging system to deliver the push notification, the notification request including the one or more communication addresses.

10. The computing system of claim 8, wherein the notification comprises an email notification, and wherein to provide the notification, the at least one processor is further configured to determine an email addresses associated with the user profile;

generate an the email notification; and send the email notification to the email address.

11. The computing system of claim 1, wherein the at least one processor is further configured to receive a first indication of granted entry to the zone or a second indication of denied entry to the zone, and to store in a first memory device of the at least one memory device the first indication and the second indication.

12. The computing device of claim 1, wherein to associate the access rule with the user profile, the at least one processor is further configured to define a relationship between the user profile and the access rule.

13. The computing device of claim 1, wherein to associate the access rule with the user profile, the at least one processor is further configured to update the user profile to include the access rule.

14. The computing system of claim 1, wherein the mobile computing device is configured to transmit first wireless signals and receive second wireless signals according to one or more defined protocols of a radio technology, the mobile computing device comprising one or more antennas and a communication processing unit, wherein the one or more antennas receive the second wireless signals and the radio unit processes the second wireless signals, and wherein the communication processing unit processes digital signals to generate the second wireless signals and the one or more antennas transmit the second wireless signals.

15. The computing system of claim 14, wherein the mobile computing device comprises a smartphone, tablet computer, a wearable device, a keyfob, or a pocket card.

16. The computing system of claim 15, wherein the radio technology includes 3G, Long Term Evolution (LTE), LTE-Advanced, 5G, IEEE 802.11, IEEE 802.16, or near-field communication (NFC).

17. The computing system of claim 1, wherein the point-of-entry device comprises a locking device configured to exchange wireless signals with the mobile computing device according to one or more defined protocols of a radio technology.

\* \* \* \* \*